United States Patent
McCormick et al.

(10) Patent No.: US 11,278,035 B2
(45) Date of Patent: Mar. 22, 2022

(54) REDUCED CARBOHYDRATE DAIRY PRODUCTS

(71) Applicant: Compagnie Gervais Danone, Paris (FR)

(72) Inventors: Casey McCormick, Fresno, CA (US); Thierry Saint-Denis, Westfield, NJ (US); Melissa McCarthy, Greenwich, CT (US); Paola Flabbi, Madrid (ES); Jose Maria Carles Piqueras, Madrid (ES)

(73) Assignee: Compagnie Gervais Danone, Paris (FR)

( * ) Notice: Subject to any disclaimer, the term of this patent is extended or adjusted under 35 U.S.C. 154(b) by 99 days.

(21) Appl. No.: 16/657,537

(22) Filed: Oct. 18, 2019

(65) Prior Publication Data

US 2020/0120947 A1    Apr. 23, 2020

Related U.S. Application Data

(60) Provisional application No. 62/747,976, filed on Oct. 19, 2018.

(51) Int. Cl.
| | |
|---|---|
| *A23C 9/127* | (2006.01) |
| *A23C 9/13* | (2006.01) |
| *A23C 9/14* | (2006.01) |
| *A23C 9/156* | (2006.01) |

(52) U.S. Cl.
CPC ............... *A23C 9/127* (2013.01); *A23C 9/13* (2013.01); *A23C 9/14* (2013.01); *A23C 9/1565* (2013.01)

(58) Field of Classification Search
CPC .. A23C 9/127; A23C 9/13; A23C 9/14; A23C 9/1565
USPC ........................................................ 426/42
See application file for complete search history.

(56) References Cited

U.S. PATENT DOCUMENTS

| | | | |
|---|---|---|---|
| 2004/0224069 A1* | 11/2004 | Aird | A23C 19/0285 426/582 |
| 2016/0157503 A1* | 6/2016 | Ramage | A23C 9/1422 426/40 |

FOREIGN PATENT DOCUMENTS

| | | | | |
|---|---|---|---|---|
| WO | 2007095969 A1 | 8/2007 | | |
| WO | WO-2018115586 A1 * | 6/2018 | ........... | A23C 9/1307 |
| WO | WO-2018142193 A1 * | 8/2018 | ........... | A23C 9/12 |

* cited by examiner

*Primary Examiner* — Brent T O'Hern
(74) *Attorney, Agent, or Firm* — Greenberg Traurig, LLP

(57) ABSTRACT

The invention relates to methods for making strained acidic, for example fermented, dairy products having reduced carbohydrates, compositions comprising strained acidic, for example fermented, dairy products having reduced carbohydrates, and methods for using such compositions, as well as products generated using strained acidic, for example fermented, dairy products having reduced carbohydrates.

27 Claims, 3 Drawing Sheets

REDUCED CARBOHYDRATE DAIRY PRODUCTS

This application claims priority to U.S. Provisional Application Ser. No. 62/747,976, filed on Oct. 19, 2018, the entirety of which is incorporated herein by reference for all purposes.

FIELD OF INVENTION

Methods for making dairy products having reduced carbohydrate concentrations are described herein. More particularly, methods for making strained fermented dairy products having reduced carbohydrate concentrations are described herein as are the strained fermented dairy products having reduced carbohydrate concentrations produced thereby. Products made using the strained fermented dairy products having reduced carbohydrate concentrations are also encompassed herein as are methods for making same.

BACKGROUND

Strained fermented dairy products, such as strained yogurts, are products obtained by a process involving fermentation of a dairy material with lactic acid bacteria and a subsequent separation step that produces a concentrated strained fermented dairy product and an acid whey by-product.

Standard Process for Making Strained Fermented Dairy Product

Processes for making strained fermented dairy products may be used to make, for example, Greek yogurt and fresh cheeses.

In a particular embodiment, a standard process calls for an initial starting material of milk having about 3.3% total nitrogen (protein) and about 4.0% milk sugar, which is fermented and separated/concentrated to produce a strained fermented dairy product having about 10.0% total nitrogen (protein) and about 4.0% milk sugar and a whey by-product comprising about 0.4% total nitrogen (protein) and about 4.0% milk sugar. The flow rate ratio for such standard processes is a ~3 inlets to 1 outlet ratio. The standard process involves a standard concentration factor of 3-4×. The standard process thereby produces a strained fermented dairy product having high protein content and >3% carbohydrates (e.g., 4.0% milk sugar). The % of carbohydrates is evident in food labels indicating that there are at least 5-6 grams (g) total carbohydrate per 150 g cup of a strained fermented dairy product made using standard processes known in the art.

In that a significant amount of carbohydrate remains in strained products made using standard processes, such products may be unsuitable for some consumers who are on restricted diets. Indeed, some consumers would appreciate access to products having high protein content and low carbohydrate content. The present invention addresses the need for strained products having a reduced content of carbohydrates and/or for processes to manufacture such products. The present invention also addresses the need for strained products having a reduced content of carbohydrates and high content of proteins and/or for processes to manufacture such products.

SUMMARY

The invention addresses at least one of the issues and/or needs mentioned above with a process for making a strained acidic dairy product comprising the steps of:

Step 1) preparing a liquid acidic carbohydrate-diluted dairy product having a carbohydrate concentration of at most 3.00% by weight and a pH of at most 5.00, said step 1) comprising:
 step a) providing an initial dairy material comprising proteins and at least one carbohydrate, wherein the at least one carbohydrate comprises at least one of lactose, galactose, glucose, galacto-oligosaccharides, or mixtures thereof,
 step b) diluting by adding an aqueous carbohydrate dilution liquid, and
 step c) acidifying Step 2) separating the liquid acidic carbohydrate-diluted dairy product to produce products comprising:
 A) a strained acidic dairy product, having a reduced carbohydrate concentration and
 B) an acid whey by-product, Step 3) recovering the strained acidic dairy product, and optionally processing it to a further food form and/or mixing it with further food ingredients.

In a first particular aspect, a process comprising the following steps is presented:
 diluting a liquid initial dairy material with water, wherein the diluting of the liquid initial dairy material with water comprises diluting 4 volumes of the liquid initial dairy material with at least 1 volume of water to produce a diluted liquid initial dairy material,
  wherein the liquid initial dairy material comprises at least one carbohydrate, and wherein the at least one carbohydrate is present at an initial carbohydrate concentration and wherein the at least one carbohydrate comprises at least one of lactose, galactose, glucose, galacto-oligosaccharides, or mixtures thereof, and wherein the liquid initial dairy material comprises at least 1.50%, notably between 1.50 and 5.00%, such as between 2 and 5% protein by weight;
 fermenting the diluted liquid initial dairy material with at least one lactic acid bacteria to produce a fermented diluted liquid dairy product;
 separating the fermented liquid dairy product to produce products comprising:
  A. a strained fermented dairy product having a reduced carbohydrate concentration relative to that of the initial carbohydrate concentration, wherein the reduced carbohydrate concentration is reduced by at least 10% notably at least 20% relative to that of the initial carbohydrate concentration, and
  B. an acid whey by-product, and
 advantageously recovering the strained fermented dairy product, and optionally processing it to a further food form and/or mixing it with further food ingredients.

In a particular embodiment of the above process, the diluting of the liquid initial dairy material comprises diluting 1 volume of the liquid initial dairy material with equal to or less than 4 volumes of water to produce the diluted liquid initial dairy material.

In another particular embodiment of the above process, the process includes the proviso that the diluted liquid initial dairy material has a protein content of from 1.5% to 6.0% by weight, from 1.5% to 2% by weight, from 2% to 3% by weight, from 3% to 4% by weight, from 4% to 5% by weight, or 5% to 6% by weight based on a total weight of the diluted liquid dairy material.

In another particular embodiment thereof, the diluted liquid initial dairy material comprises ≤2.0% carbohydrate by weight.

In a second particular aspect, a process comprising the following steps is presented:

fermenting a liquid initial dairy material having at least 1.5%, notably at least 2% protein by weight with at least one lactic acid bacteria to produce a fermented liquid dairy material,
    wherein the liquid initial dairy material comprises at least one carbohydrate, and wherein the at least one carbohydrate is present at an initial carbohydrate concentration and wherein the at least one carbohydrate comprises at least one of lactose, galactose, glucose, galacto-oligosaccharides, or mixtures thereof;
diluting the fermented liquid dairy material with water, wherein the diluting of the fermented liquid dairy material comprises diluting 4 volumes of the fermented liquid dairy material with at least 1 volume of water to produce a diluted fermented liquid dairy product, wherein the fermenting and diluting are concomitant;
separating the diluted fermented liquid dairy product to produce products comprising:
    A. a strained fermented dairy product having a reduced carbohydrate concentration relative to that of the initial carbohydrate concentration, wherein the reduced carbohydrate concentration is reduced by at least 10%, notably at least 20% relative to that of the initial carbohydrate concentration, and
    B. an acid whey by-product, and
advantageously recovering the strained fermented dairy product, and optionally processing it to a further food form and/or mixing it with further food ingredients.

In a particular embodiment of the above process, the diluting of the fermented liquid dairy material comprises diluting 1 volume of the fermented liquid dairy material with equal to or less than 4 volumes of water to produce the diluted fermented liquid dairy material.

In a third particular aspect, a process comprising the following steps is presented:

fermenting a liquid initial dairy material having at least 1.5%, notably at least 2% protein by weight with at least one lactic acid bacteria to produce a fermented liquid dairy product,
    wherein the liquid initial dairy material comprises at least one carbohydrate, and wherein the at least one carbohydrate is present at an initial carbohydrate concentration and wherein the at least one carbohydrate comprises at least one of lactose, galactose, glucose, galacto-oligosaccharides, or mixtures thereof;
diluting the fermented liquid dairy product with water, wherein the diluting of the fermented liquid dairy product comprises diluting 4 volumes of the fermented liquid dairy product with at least 1 volume of water to produce a diluted fermented liquid dairy product;
separating the diluted fermented liquid dairy product to produce products comprising:
    A. a strained fermented dairy product having a reduced carbohydrate concentration relative to that of the initial carbohydrate concentration, wherein the reduced carbohydrate concentration is reduced by at least 10%, notably at least 20% relative to that of the initial carbohydrate concentration, and
    B. an acid whey by-product, and
advantageously recovering the strained fermented dairy product, and optionally processing it to a further food form and/or mixing it with further food ingredients.

In a particular embodiment of the above process, the diluting of the fermented liquid dairy product is equal to or less than 1:4 volume/volume (v/v), wherein 1 volume of the fermented liquid dairy product is diluted with equal to or less than 4 volumes of water to produce the diluted fermented liquid dairy product.

In a fourth particular aspect, a process comprising the following steps is presented:

diluting a concentrated liquid initial dairy material with water to produce a diluted liquid initial dairy material, wherein the diluting of the concentrated liquid initial dairy material with water comprises diluting 1 volume of the concentrated liquid initial dairy material with at least 1 volume of water,
    wherein the concentrated liquid initial dairy material comprises at least one carbohydrate, and wherein the at least one carbohydrate is present at an initial carbohydrate concentration and wherein the at least one carbohydrate comprises at least one of lactose, galactose, glucose, galacto-oligosaccharides, or mixtures thereof, and wherein the concentrated liquid initial dairy material comprises at least 6% protein by weight;
fermenting the diluted liquid initial dairy material with at least one lactic acid bacteria to produce a fermented liquid dairy product;
separating the fermented liquid dairy product to produce products comprising:
    i. a strained fermented dairy product having a reduced carbohydrate concentration relative to that of the initial carbohydrate concentration, wherein the reduced carbohydrate concentration is reduced by at least 20% relative to that of the initial carbohydrate concentration, and
    ii. an acid whey by-product, and
advantageously recovering the strained fermented dairy product, and optionally processing it to a further food form and/or mixing it with further food ingredients.

In a particular embodiment thereof, the concentrated liquid initial dairy material comprises between 6-15% protein by weight, in particular between 10% and 12% protein by weight and even more particularly between 10.5% and 11.5% protein by weight.

In a more particular embodiment thereof, the diluted liquid initial dairy material comprises ≤2.0% carbohydrate by weight.

In a particular embodiment of the processes described herein, the diluting is performed batch-wise. In another particular embodiment, the diluting is performed continuously throughout the process. In another particular embodiment of the processes described herein, the diluting further comprises mixing.

In a particular embodiment of the processes described herein, the separating is centrifugation or ultrafiltration.

In particular embodiments of the processes described herein, the initial dairy material, and notably the liquid initial dairy material, comprises at least one of milk, half skimmed milk, skimmed milk, milk powder, skimmed milk powder, milk concentrate, skim milk concentrate, condensed milk, condensed skim milk, evaporated milk, evaporated skim milk, ultrafiltered milk retentate, ultrafiltered skim milk retentate, microfiltered milk, microfiltered skim milk, milk proteins, milk protein concentrate (MPC), whey protein, whey protein concentrate (WPC), whey protein isolate (WPI), casein or caseinate, cream, buttermilk, or mixtures thereof.

In particular embodiments of the processes described herein, the strained fermented dairy product having a reduced carbohydrate concentration has a Calcium/Protein ratio of higher than 0.03.

In particular embodiments of the processes described herein, the process is free of a lactose addition step.

In particular embodiments of the processes described herein, the process further comprises
- diluting the strained fermented dairy product having a reduced carbohydrate concentration with water, wherein the diluting of the strained fermented dairy product having a reduced carbohydrate concentration with water comprises diluting 4 volumes of the strained fermented dairy product having a reduced carbohydrate concentration with at least 1 volume of water to produce a diluted strained fermented dairy product having a reduced carbohydrate concentration,
- separating the diluted strained fermented dairy product having a reduced carbohydrate concentration to produce
- a) a secondary strained fermented dairy product having a reduced carbohydrate concentration relative to that of the carbohydrate concentration of the strained fermented dairy product having a reduced carbohydrate concentration and
- b) an acid whey by-product.
- advantageously recovering the secondary strained fermented dairy product, and optionally processing it to a further food form and/or mixing it with further food ingredients.

In a particular embodiment, the diluting further comprises mixing.

DETAILED DESCRIPTION OF THE INVENTION

Figure 1:
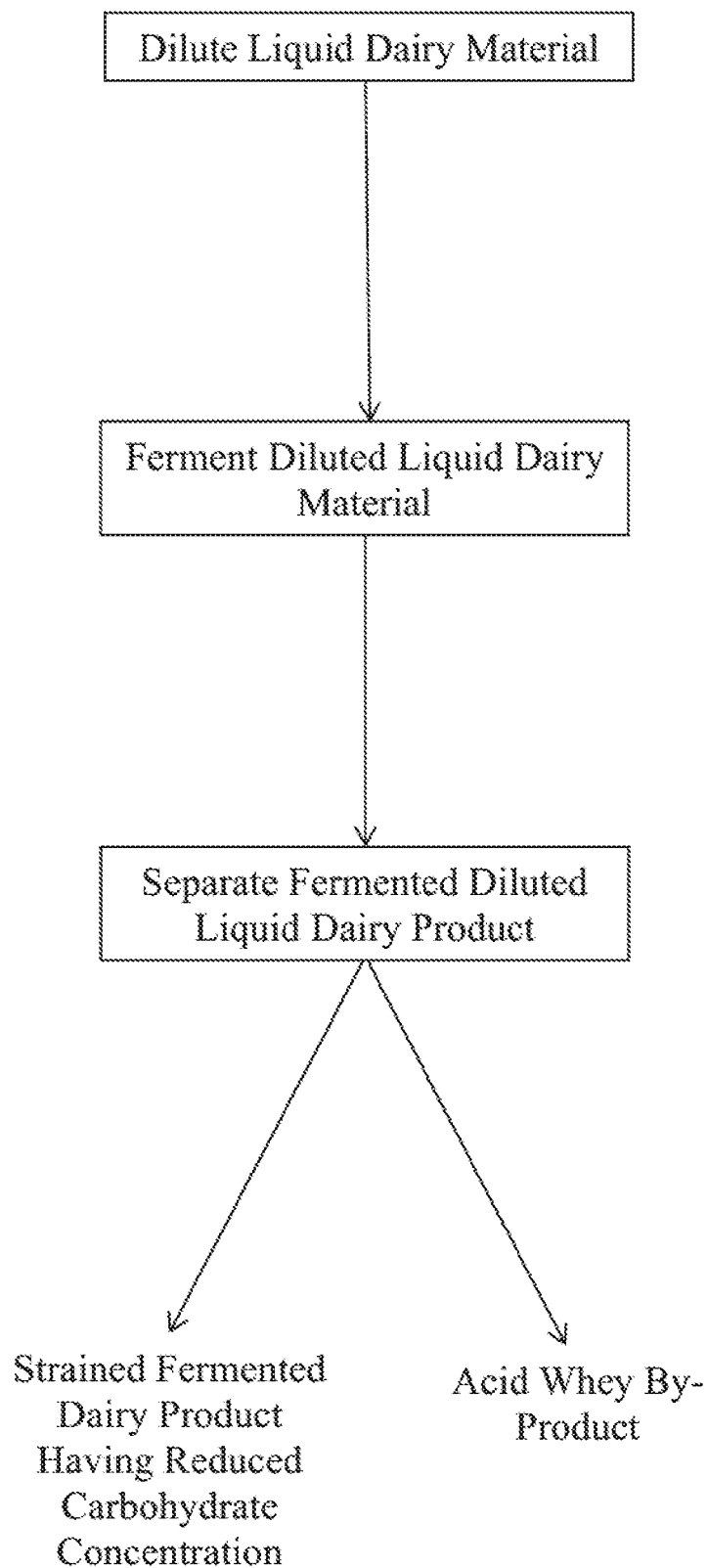
FIG. 1 is a flowchart depicting a particular embodiment of the invention.
Figure 2:
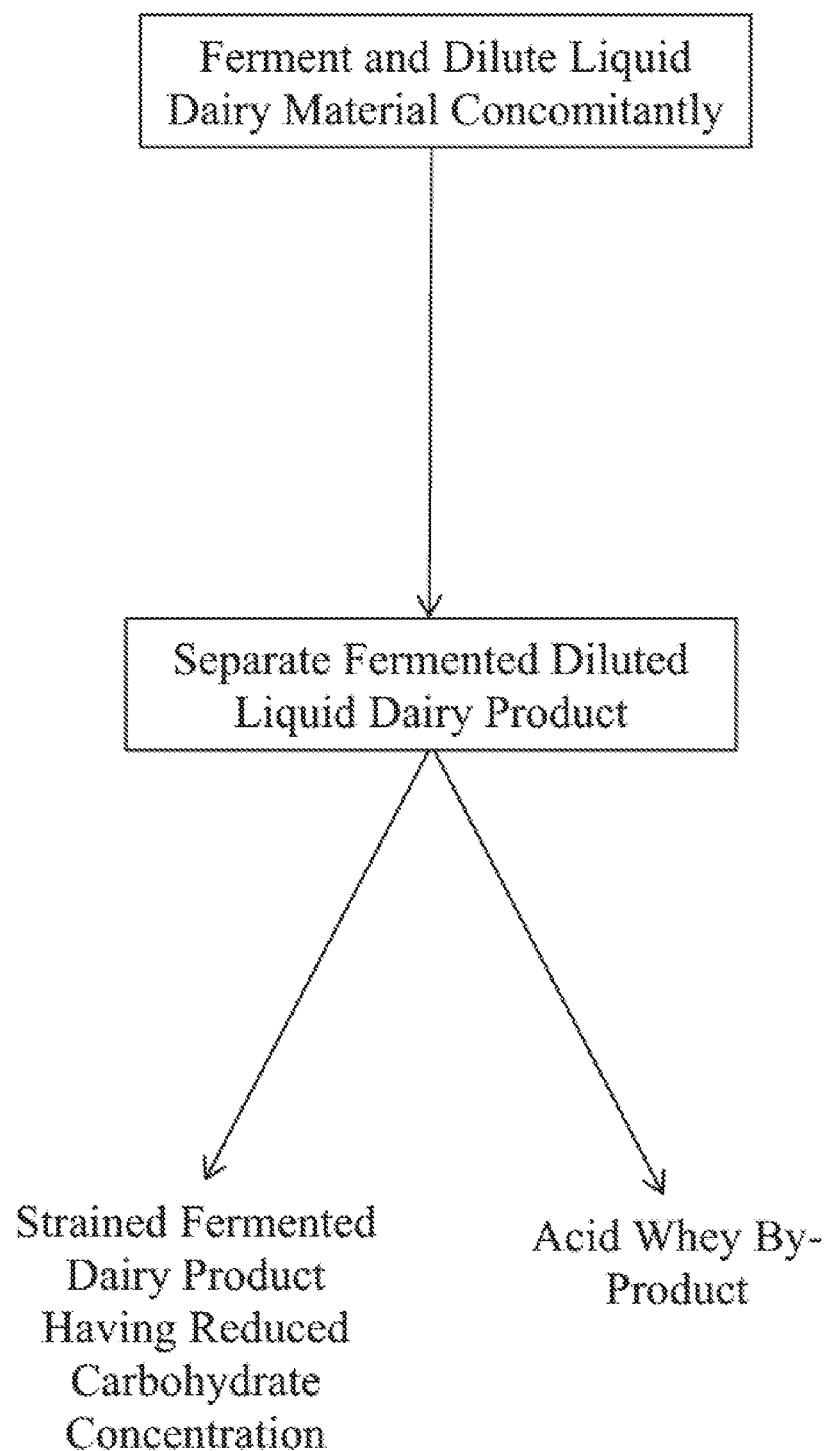
FIG. 2 is a flowchart depicting a particular embodiment of the invention.
Figure 3:
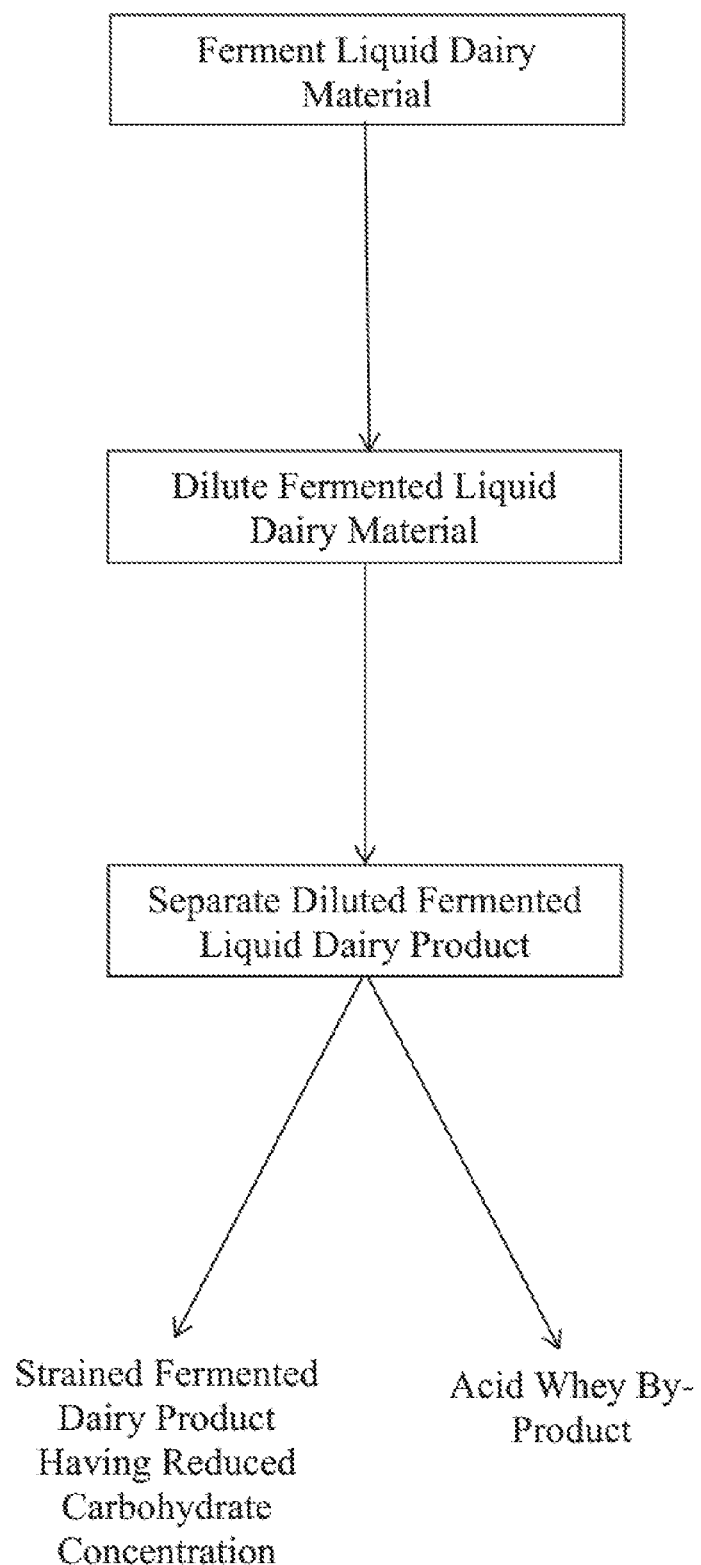
FIG. 3 is a flowchart depicting a particular embodiment of the invention.

Processes for making strained fermented dairy products such as, for example, "Greek yogurt" are directed to the objective of making a concentrated product from a dairy product that has been fermented by lactic acid producing bacteria. Upon fermentation, the lactic acid bacteria lower the pH and cause protein to precipitate and form a curd. The concentrating is achieved by a separation step that typically involves ultrafiltration, or centrifugal separation. The separation step is essential to the process and concentrates the proteins in the fermented dairy product curd by separating the acid whey by-product from the curd. The fermentation and separation steps of the process produce a strained fermented dairy product having high protein content and high density relative to non-strained dairy products. Strained fermented dairy products are, therefore, recognized as concentrated products. That being the case, the introduction of a diluting step at any step in the process of making a strained fermented dairy product is counter-intuitive to the underlying objective of making a strained fermented dairy product.

Definitions

The term "dairy" refers to materials, compositions or products, based on or derived from, at least partially, animal milk such as cow milk, sheep milk, goat milk, water buffalo milk, or bison milk, preferably cow milk.

The terms "strained acidic dairy product" or "strained fermented dairy product" are used herein to describe respectively an acidic or fermented dairy product issued from a separation step as described herein. A strained acidic dairy product is an acidified dairy product made by acidification from a liquid material, at least a portion of which is a dairy liquid material and separated by a separation step as described herein. Acidification can be performed by fermentation. A strained fermented dairy product thus is a fermented dairy product made by fermentation of a liquid material, at least a portion of which is a dairy liquid material. Lactic acid bacteria are typically used for the fermentation process. A strained acidic, e.g. fermented, dairy product has a thicker consistency relative to an unstrained acidic dairy product because most of the whey is removed as a consequence of the separation step. Non-limiting examples of forms of strained acidic, for example fermented, dairy products include, for example, products in the form of Greek yogurt, fresh cheeses, strained yogurt drinks, and frozen strained yogurt products.

The term "carbohydrate" is used herein, unless otherwise provided, to designate lactose, galactose, glucose, galacto-oligosaccharides, or mixtures thereof. The term "milk sugar(s)" can be used herein to designate the same. Unless compositions or products specifically comprise galactose, glucose, galacto-oligosaccharides or mixtures thereof, the terms "carbohydrate" or "milk sugar" are used herein to designate lactose.

The term "reduced carbohydrate concentration" is used herein to describe a product or composition that has a lower carbohydrate concentration relative to a product or composition, in an initial state and/or produced according to standard processes used for making strained acidic, for example fermented, dairy products. Non-limiting examples of forms of strained acidic, for example fermented, dairy products having reduced carbohydrate concentration include, for example, products in the form of Greek yogurt, fresh cheeses, strained yogurt drinks, and frozen strained yogurt products.

A strained acidic, for example fermented, dairy product having a reduced carbohydrate concentration also particularly has a lower carbohydrate concentration relative to a liquid dairy material from which it is made (for example, standard milk or reconstituted milk obtained from powder milk), when tested in an assay that measures carbohydrate concentration. The strained acidic (e.g. fermented) dairy product having reduced carbohydrate concentration has in particular a reduced carbohydrate concentration in comparison to the initial dairy material (e.g. liquid initial dairy material), or even in comparison to the liquid acidic (e.g. fermented) carbohydrate-diluted dairy product. In embodiments thereof, the amount of carbohydrate in a strained acidic, for example fermented, dairy product having reduced carbohydrate concentration is reduced by at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or at least 95% [% expressed as carbohydrate weight/total product weight (w/w)] when compared to the amount of carbohydrate in the liquid dairy material from which it is made (for example from standard milk). Carbohydrate concentrations of liquid initial dairy materials that can be used herein to generate strained acidic, for example fermented, dairy products having reduced carbohydrate concentrations typically range from 1.50 to 5.00%, such as 2.00% to 5.00% by weight, for example from 1.50 to 2.00%, or from 2.00 to 2.50%, or from 2.50 to 3.00%, or from 3.00 to 3.50%, or from 3.50 to 4.00%, or from 4.00 to 4.50%, of from 4.50 to 5.00% carbohydrate weight/total weight (w/w).

Suitable assays for measuring carbohydrate concentrations include high-performance liquid chromatography (HPLC) and high-performance anion exchange chromatography with pulsed amperometric detection (HPAEC-PAD). Preferably, HPAEC-PAD will be used.

In a particular embodiment, an assay for measuring lactose concentrations comprises Association of Official Agricultural Chemists (AOAC) 984.22, which assay utilizes liquid chromatography (LC) to detect lactose present.

The terms "aqueous carbohydrate dilution liquid" or "dilution liquid" refer to an aqueous liquid that may be used to reduce the carbohydrate concentration by weight when added, for example mixed, with a material, composition or product comprising a carbohydrate. Thus, the carbohydrate concentration by weight of the dilution liquid is lower than the concentration by weight of carbohydrate of the material or product, particularly at least twice lower, more particularly at least 10 times lower. The dilution liquid is still more particularly substantially free of carbohydrate. The dilution liquid is particularly substantially free of fat. The dilution liquid is particularly substantially free of protein. The dilution liquid can be water.

The term "acid whey" is used herein to describe a by-product of a separation step. In embodiments described herein wherein the acid whey is a by-product of a separation step wherein the product is a strained acidic, e.g. fermented, dairy product having reduced carbohydrate concentrations, the acid whey has a milk sugar concentration of about 1.6%, <1.6%, <1.5%, or ≤1.0%.

The term "% by weight" is based on a total weight of the corresponding product, if not otherwise specified. For example, a material, composition or product comprising carbohydrates in an amount of 2.00% by weight means 2.00% by weight based on the total weight of the material, composition or product.

The term "substantially free" means in the context of the present invention that the concentration in the product of the concerned ingredient may be lower than 0.1%, in particular lower than 0.05%, more particularly lower than 0.01%. More preferably, the term "substantially free" means in the context of the present invention that there is no detectable ingredient (e.g. carbohydrate, fat or protein) using an acceptable analytical method as disclosed herein.

The term "about" means in the context of the present invention that the concerned value may be lower or higher by 10%, especially by 5%, in particular by 1%, than the value indicated.

The term "liquid" means in the context of the present invention a substance or a composition which is not a solid or a gas and which can flow and be poured.

The term "concentrated liquid", "concentrated" or "concentrate form" means in the context of the present invention that the concentration step is made by heating the milk until notably at least about 60% of its water content has evaporated. More preferably the term "concentrated liquid", "concentrated" or "concentrate form" means in the context of the present invention that the dry matter of the milk increases as the water is evaporated.

The "fat content" of a composition corresponds to the weight of the fat components present in the composition relatively to the total weight of the composition. The fat content is expressed as a weight percentage. The fat content can be measured by the Weibull-Berntrop gravimetric method described in the standard NF ISO 8262-3. Usually the fat content is known based on the fat content of the ingredients used to prepare the composition, and the fat content of the product is calculated based on these data.

The "protein content" of a composition corresponds to the weight of the proteins present in the composition relative to the total weight of the composition. The protein content is expressed as a weight percentage. The protein content may be measured by Kjeldahl analysis (NF EN ISO 8968-1) as the reference method for the determination of the protein content of dairy products based on measurement of total nitrogen. Nitrogen is multiplied by a factor, typically 6.38, to express the results as total protein. The method is described in both AOAC Method 991.20 (1) and International Dairy Federation Standard (IDF) 20B:1993. Usually the total protein content is known for all the ingredients used to prepare the product, and total protein content is calculated from these data.

The "dry matter" of a product corresponds to the weight of non-volatile components present in the product relatively to the total weight of the product. The dry matter is expressed as a weight percentage. The "non-volatile components" correspond to the solids that remain after an evaporation step of the product at 103-105° C. The dry matter can be measured by the method disclosed in NF V04 370 comprising a heating step at 102° C. Usually the dry matter is known for all the ingredients used to prepare the product, and dry matter is calculated from these data.

Process

The strained acidic, for example fermented, dairy product having reduced carbohydrate concentrations may be prepared in a process of manufacturing from a dairy material, in a powder or liquid form, preferably in a liquid form. Mixtures of liquid dairy material and vegetal mixes are also encompassed herein as the starting material in the processes of manufacturing described herein and known in the art. Details of materials and process steps are provided below.

Step 1)

Step 1) is a step of preparing a liquid acidic, e.g. fermented, carbohydrate-diluted dairy product having a carbohydrate concentration of at most 3.00% by weight and a pH of at most 5.00.

In a particular embodiment, step 1) is free of a lactose addition step. In a particular embodiment, the process is free of a lactose addition step.

Step 1) involves a dilution step b), wherein an aqueous carbohydrate dilution liquid is added to an initial material or composition. This step reduces the carbohydrate concentration of the initial material composition or product. The carbohydrate concentration after dilution, in particular liquid acidic, e.g. fermented, carbohydrate-diluted dairy product, is at most 3.00% by weight, such as at most 2.50% by weight, for example at most 2.25% by weight, in particular at most 2.00% by weight. The carbohydrate concentration after dilution, in particular liquid acidic, e.g. fermented, carbohydrate-diluted dairy product, can be at least 0.10% by weight. For example, the carbohydrate concentration after dilution, in particular liquid acidic, e.g. fermented, carbohydrate-diluted dairy product, can be from 0.10 to 0.50% by weight, or from 0.50 to 0.75%, or from 0.75 to 1.00%, or from 1.00 to 1.25%, or from 1.25 to 1.50%, or from 1.50 to 1.75%, or from 1.75 to 2.00%, or from 2.00 to 2.25%, or from 2.25 to 2.50%, or from 2.50 to 2.75%, or from 2.75 to 3.00%.

The dilution step can also reduce the protein concentration of the initial material, composition or product. The protein concentration after dilution, in particular liquid acidic, e.g. fermented, carbohydrate-diluted dairy product, can be for example at least 1.50% by weight, such as at least 1.60% by weight. The protein concentration after dilution, in particular liquid acidic, e.g. fermented, carbohydrate-diluted dairy product, is typically at most 4.80% by weight. For example, the protein concentration after dilution, in particular liquid acidic, e.g. fermented, carbohydrate-diluted dairy product, can be from 1.50 to 1.60%, or from 1.60 to 1.75%, or from 1.75% to 2.00%, or from 2.00% to 2.25%, or from 2.25% to 2.50%, or from 2.50% to 2.75%, or from 2.75% to 3.00%, or from 3.00% to 3.25%, or from 3.25% to 3.50%, or from 3.50% to 3.75%, or from 3.75% to 4.00, or from 4.00% to 4.25%, or from 4.25% to 4.50%, or from 4.50% to 4.75%, or from 4.75% to 4.80.

The liquid acidic, e.g. fermented, carbohydrate-diluted dairy product can have a ratio by weight of protein to carbohydrate of from 0.50 to 1.50, for example from 0.50 to 0.75, or from 0.75 to 1.00, or from 1.00 to 1.25, or from 1.25 to 1.50.

The liquid acidic, e.g. fermented, carbohydrate-diluted dairy product can have a dry matter of at least 1.70% by weight, notably at least 2.00 by weight, such as at least 3.00 by weight. The solid content of the liquid acidic, e.g. fermented, carbohydrate-diluted dairy product can be from 1.70 to 11.00 by weight, such as from 1.70% to 2.00%, or from 2.00% to 2.50%, or from 2.50% to 3.00%, or from 3.00% to 3.50%, or from 3.50% to 4.00%, or from 4.00% to 4.50%, or from 4.50% to 5.00%, or from 5.00% to 5.50%, or from 5.50% to 6.00%, or from 6.00% to 6.50%, or from 6.50% to 7.00%, or from 7.00% to 8.00%, or from 8.00% to 9.00%, or from 9.00% to 10.00%, or from 10.00% to 11.00%.

Step 1) also involves an acidifying step c), wherein a material or composition is modified to have a lower pH. An example is fermentation with lactic acid bacteria. The pH after acidification is at most 5.00. The pH after acidification can be at most 4.80. The pH after acidification can be at least 3.00. For example, the pH after acidification can be from 3.00 to 3.50, or from 3.50 to 4.00, or from 4.00 to 4.50, or from 4.50 to 4.80, or from 4.80 to 5.00.

Step 1) also involves an initial step a) of providing an initial dairy material comprising proteins and at least one carbohydrate, wherein the at least one carbohydrate comprises at least one of lactose, galactose, glucose, galacto-oligosaccharides, or mixtures thereof. Details about dairy materials are provided below. The initial dairy material can be provided in various forms, such as dairy material powders, dairy material liquids, optionally in concentrate forms, for example milk or milk concentrates. Preferably, it is a dairy material liquid, optionally in concentrated form, which includes reconstituted powder.

The initial dairy material can be a liquid initial dairy material having an initial carbohydrate concentration of at least 2.50% by weight, for example from 2.50 to 3.00%, or from 3.00 to 3.25% or from 3.25 to 3.50% of from 3.50 to 3.70%, or from 3.70 to 3.80%, or from 3.80 to 4.00%, or form 4.00 to 4.25%, or from 4.25 to 4.50%, or from 4.50 to 4.75%, or from 4.75 to 5.00%.

The liquid initial dairy material can have a protein concentration of from at least 2.00% by weight, for example from 2.00% to 2.50%, or from 2.50% to 3.00%, or from 3.00% to 3.50%, or from 3.50% to 4.00%, or from 4.00% to 4.50%, or from 4.50% to 5.00%, or from 5.00% to 5.50%, or from 5.50% to 6.00%.

The liquid initial dairy material can have a ratio by weight of protein to carbohydrate of from 1.70 to 5.00, for example from 1.70 to 1.80, or from 1.80 to 2.00, or from 2.00 to 2.50, or from 2.50 to 3.00, or from 3.00 to 3.50, or from 3.50 to 4.00, or from 4.00 to 4.50, or from 4.50 to 5.00.

The dilution of the liquid initial dairy material can reduce the carbohydrate concentration by at least 20% relative to that of the initial carbohydrate concentration. The reduction can be of at least 30% or be at least 40% or by at least 50%. Dilution can also reduce the protein concentration by at least 20% relative to that of the initial protein concentration. The reduction can be of at least 30%, or of at least 40% or of at least 50%.

Dilution step b) can be performed batch-wise or continuously throughout Step 1) of the process. In a particular embodiment, the dilution step b) can further comprise mixing. In another particular embodiment, the dilution step b) can further comprise a diafiltration.

In an embodiment the dilution liquid is substantially free of carbohydrate. The dilution liquid advantageously is also substantially free of protein. The dilution liquid can be also free of fat. In an embodiment the dilution liquid is water. As used herein, the term "water" refers to "drinking water" or "potable water", which is water that is safe to drink or to use for food preparation. Accordingly, water as used herein refers to water ($H_2O$) that substantially does not comprise synthetic or natural compounds or biological agents (e.g., viruses, bacteria) in amounts that are harmful when consumed. In a particular embodiment, water as used herein may comprise buffering salts and impurities in amounts acceptable for potable water.

If the initial dairy material is a powder, the dilution step leads to carbohydrate concentrations lower than standard milk concentrations, as provided above. It also typically leads to protein concentrations lower than standard milk concentrations. In such a case the dilution step b) may optionally comprise a preliminary dilution step to reach a liquid with standard milk concentrations, and a subsequent step to reach the concentrations mentioned above.

If the initial dairy material is a liquid, also called milk liquid or dairy liquid, the dilution step leads to carbohydrate concentrations lower than the initial concentration, as provided above. It also typically leads to protein concentrations lower than the initial concentration.

If the initial dairy material is a concentrate liquid, also called milk concentrate liquid or dairy concentrate liquid, the dilution step leads to carbohydrate concentrations lower than standard milk concentrations, as provided above. It also typically leads to protein concentrations lower than standard milk concentrations. In such a case the dilution step b) may optionally comprise a preliminary dilution step to reach standard milk concentrations, and a subsequent step to reach the concentrations mentioned above.

Steps a), b) and c) may be carried out in various orders. In an embodiment, step a) is carried out before step b) and step c).

The dilution step b) can be performed between step a) and step c) and can comprise mixing 1 part by volume of an initial dairy material, more particularly in a liquid or concentrate form, with at least 0.25 part by volume of the dilution liquid. In an embodiment, mixing is performed with at most 4 parts by volume of the dilution liquid.

The dilution step b) may be performed after step a) and step c) and can comprise mixing 1 part by volume of initial acidified dairy material with at least 0.25 part by volume of the dilution liquid. In an embodiment, mixing is performed with at most 4 parts by volume of the dilution liquid.

The dilution step b) may be performed after step a) and together with step c) and can comprise mixing 1 part by volume of initial acidified dairy material with at least 0.25 part by volume of the dilution liquid. In an embodiment, mixing is performed with at most 4 parts by volume of the dilution liquid.

The dilution step b) may be performed together with step a) and before or after step c) and can comprise mixing 1 part by volume of initial dairy material with at least 0.25 part by volume of the dilution liquid. In an embodiment, mixing is performed with at most 4 parts by volume of the dilution liquid. Typically, the dilution step b) is diafiltration and is advantageously performed along with an ultrafiltration step providing an ultrafiltered milk as initial dairy material. The ultrafiltered milk is thus diluted directly during its preparation.

In an embodiment, Step 1) comprises step a), then step b), then step c). In an embodiment, step 1) involves providing a liquid dairy material, such as milk, then diluting by adding a dilution liquid, then acidifying for example by fermenting, preferably with liquid acid bacteria. In an embodiment, step 1) involves providing a liquid dairy material in a concentrate form, such as milk concentrate or milk condensate or evaporated milk, then diluting by adding a dilution liquid, then acidifying for example by fermenting, particularly with liquid acid bacteria. In an embodiment, step 1) involves providing a dairy material in a powder form, such as milk powder, then diluting by adding a dilution liquid, then acidifying for example by fermenting, particularly with liquid acid bacteria.

In an embodiment, Step 1) comprises step a), then step b) and step c), wherein step b) and step c) are concomitant. In an embodiment step 1) involves providing a liquid dairy material, such as milk, then diluting by adding a dilution liquid, while acidifying for example by fermenting, particularly with liquid acid bacteria. In an embodiment, step 1) involves providing a liquid dairy material in a concentrate form, such as milk concentrate or milk condensate or evaporated milk, then diluting by adding a dilution liquid, while acidifying for example by fermenting, particularly with liquid acid bacteria. In an embodiment, step 1) involves providing a dairy material in a powder form, such as milk powder, then diluting by adding a dilution liquid, while acidifying for example by fermenting, particularly with liquid acid bacteria.

In an embodiment, Step 1) comprises step a), then step c), then step b). In an embodiment, step 1) involves providing a liquid dairy material, such as milk, then acidifying for example by fermenting, preferably with liquid acid bacteria, then diluting by adding a dilution liquid. In an embodiment, step 1) involves providing a liquid dairy material in a concentrate form, such as milk concentrate or milk condensate or evaporated milk, then acidifying for example by fermenting, particularly with liquid acid bacteria, then diluting by adding a dilution liquid. In an embodiment, step 1) involves providing a dairy material in a powder form, such as milk powder, then acidifying for example by fermenting, particularly with liquid acid bacteria, then diluting by adding a dilution liquid.

When a concentrate or powder dairy material is used, it has to be reconstituted before fermentation by adding water.

In an embodiment, Step 1) comprises step a) and step b) then step c), wherein step a) and step b) are concomitant. In an embodiment step 1) involves providing and diluting (notably by diafiltration) concomitantly a liquid dairy material, such as ultrafiltered milk, and then acidifying for example by fermenting, particularly with liquid acid bacteria.

Dairy Material

The process involves providing and processing a dairy material, in a liquid or powder form. Examples include milk, half skimmed milk, skimmed milk, milk powder, skimmed milk powder, milk concentrate, condensed milk, skim milk concentrate, condensed skim milk, evaporated milk, evaporated skim milk, milk proteins, cream, buttermilk, or mixtures thereof. The dairy material typically comprises milk and/or ingredients obtained from milk (e.g., milk protein concentrate, whey protein concentrate, and ultrafiltered milk). The "liquid dairy material" may comprise a "milk-based composition". The "liquid dairy material" may comprise 100% "milk-based composition", at least 95% "milk-based composition"; at least 90% "milk-based composition"; at least 85% "milk-based composition"; at least 80% "milk-based composition"; at least 75% "milk-based composition"; at least 70% "milk-based composition"; at least 65% "milk-based composition"; at least 60% "milk-based composition"; at least 55% "milk-based composition"; or at least 50% "milk-based composition".

Milk-based compositions useful in such products and/or processes are known by those of skill in the art of dairy products and more particularly those of skill in the art of fermented dairy products. Herein a milk-based composition encompasses a composition with milk or milk fractions, and compositions obtained by mixing several previously separated milk fractions. As described herein, water or other additives may be added to milk, milk fractions, and mixtures. In a particular embodiment, the milk is an animal milk, for example, cow's milk. Alternative animal milk may be used, such as, for example, sheep milk, goat milk, water buffalo milk, or bison milk.

The milk-based composition can typically comprise ingredients selected from the group consisting of milk, half skimmed milk, skimmed milk, milk powder, skimmed milk powder, milk concentrate, skim milk concentrate, milk proteins, cream, buttermilk and mixtures thereof. Some water or additives can be mixed therewith. Examples of additives that can be added include fibers and texture modifiers, notably texture modifiers. Examples include texturizing agents used to modify the overall texture or mouthfeel of a food product and include gelling agents (for ex. gelatine, agar, carrageenan, pectin, natural gums), stabilisers (for ex. agar, pectin, Arabic gum, gelatin), emulsifiers (for ex. lecithin, mono- and di-glycerides of fatty acids (E471), esters of mono and di-glycerides of fatty acid (E472a-f)), and thickeners (for ex. guar gum, xanthan gum, pectin, agar, carrageenan, alginic acid).

The milk-based composition can typically have a fat content of from 0.00% to 5.00% by weight, for example, of from 0.00% to 1.00% or from 1.00% to 2.00% or from 2.00% to 3.00% or from 3.00% to 4.00% or from 4.00% to 5.00%.

The milk-based composition can typically have a protein content of from 2.00% to 6.00% by weight, for example, of from 2.00% to 3.00% or from 3.00% to 4.00% or from 4.00% to 5.00% or from 5.00% to 6.00%.

The liquid dairy material comprises carbohydrates. The amount of carbohydrates is typically about 3.80% to 5.00% by weight.

In one embodiment the dairy material comprises the following contents (% by weight):
from 3.00% to 3.50% milk protein
from 0.00% to 3.50% fat
from 3.80% to 5.00% carbohydrates.

The pH of the milk can for example be of from 6.60 to 7.00. The dry matter of the milk may, for example, be from 6.80% to 13.00%. In one embodiment, the milk is low-fat milk comprising less than 2.00% fat, more particularly less than 1.00% fat, and more particularly less than 0.50% fat. The milk may, for example, be skimmed milk.

The ingredients of the milk-based composition and/or the amounts thereof can be selected to have the amounts of proteins and/or fat and/or carbohydrates mentioned above.

In a particular embodiment, the composition of the carbohydrates in the dairy material is changed by implementing enzymes. Such enzymes may be selected to act on carbohydrates such as lactose, galactose, glucose and/or galacto-oligosaccharides. For example, a lactase enzyme can be used to hydrolyze lactose into glucose and galactose. Such enzymes are known by those skilled in the art and are commercially available. Such modifications can be implemented before, during, or after acidification step c).

Step c)—Acidification

Step c) is an acidification step. It is typically performed such that the pH reached modifies the structure or conformation of proteins of the dairy material to form a precipitate or curd. Such acidification steps are known by those skilled in the art. Examples of which comprise the following:

fermenting with lactic acid bacteria [e.g., with mesophilic or thermophilic bacteria; fermented dairy product (combination of dairy ingredients): pH<4.80], fermenting with enzymes, such as Rennet or Chymosin [fermented dairy product (combination of dairy ingredients): pH<4.80], and/or adding an acidic compound: direct addition of acid to the dairy material (dairy ingredients); pH<4.80; examples of suitable acids include, without limitation, lactic acid, citric acid and/or malic acid.

Preferably, step c) is a fermentation step.

Fermentation

In an embodiment, the process involves a fermentation step with at least one lactic acid bacteria. In this step, a liquid dairy material is inoculated with the lactic acid bacteria and the mixture is then allowed to ferment at a fermentation temperature. Such inoculation and fermentation operations are known by those of skill in the art. If such a fermentation step is performed, the initial dairy material should contain lactose, glucose, galactose or a mixture thereof, which is well known to the one skilled in the art.

According to a particular embodiment, a lactase also is added to the liquid dairy material, which has been preferably heat treated.

During fermentation, the lactic acid bacteria produce lactic acid, which leads to a decrease in pH. As the pH decreases, proteins coagulate to form a curd, typically at a breaking pH.

The fermentation temperature may be from 30° C. to 45° C., and more particularly from 35° C. to 40° C., with a pH decrease to a breaking pH at which proteins coagulate to form a curd.

The breaking pH can be more particularly from 3.5 to 5.0, even more particularly from 4.00 to 5.00, and still more particularly from higher than 4.50 to 4.80.

Lactic Acid Bacteria

In one embodiment, the process involves lactic acid bacteria. Appropriate lactic acid bacteria are known by those of skill in the art. Lactic acid bacteria may be referred to herein as ferments or cultures or starters. Examples of lactic acid bacteria that can be used include:

Lactobacilli, for example, *Lactobacillus acidophilus, Lactobacillus casei, Lactobacillus paracasei, Lactobacillus plantarum, Lactobacillus reuteri, Lactobacillus johnsonii, Lactobacillus helveticus, Lactobacillus brevis, Lactobacillus rhamnosus,*

Streptococci, for example, *Streptococcus thermophilus, Streptococcus cremoris,*

Bifidobacteria, for example, *Bifidobacterium bifidum, Bifidobacterium longum, Bifidobacterium breve, Bifidobacterium animalis,*

Lactococci, for example, *Lactococcus lactis* subsp. *lactis, Lactococcus lactis* subsp. *cremoris,*

Propionibacterium such as, *Propionibacterium freudenreichii, Propionibacterium freudenreichii* ssp *shermanii, Propionibacterium acidipropionici, Propionibacterium thoenii,* and mixtures and/or combinations thereof.

Notably, the lactic acid bacteria that can be used include:

Lactobacilli, for example, *Lactobacillus acidophilus, Lactobacillus casei, Lactobacillus plantarum, Lactobacillus reuteri, Lactobacillus johnsonii, Lactobacillus helveticus, Lactobacillus brevis, Lactobacillus rhamnosus,*

Streptococci, for example, *Streptococcus thermophilus,*

Bifidobacteria, for example, *Bifidobacterium bifidum, Bifidobacterium longum, Bifidobacterium breve, Bifidobacterium animalis,*

Lactococci, for example, *Lactococcus lactis* subsp. *lactis,*

Propionibacterium such as, *Propionibacterium freudenreichii, Propionibacterium freudenreichii* ssp *shermanii, Propionibacterium acidipropionici, Propionibacterium thoenii,* and mixtures and/or combinations thereof.

The lactic acid bacteria may comprise, may essentially consist of, or may consist of, *Lactobacillus delbrueckii* ssp. *bulgaricus* (i.e. *Lactobacillus bulgaricus*) and *Streptococcus salivarius* ssp. *thermophilus* (i.e. *Streptococcus thermophilus*) bacteria. The lactic acid bacteria used in the invention typically comprise an association of *Streptococcus thermophilus* and *Lactobacillus bulgaricus* bacteria. This association is known and often referred to as a yogurt symbiosis. Examples include culture YoMix® 495 marketed by Dupont.

The lactic acid bacteria used in the invention typically comprise an association of *Streptococcus thermophilus, Lactobacillus bulgaricus* bacteria and *Lactobacillus acidophilus,* in particular two *Lactobacillus acidophilus.*

More preferred lactic acid bacteria to be used in the present invention are selected from:

*Lactobacillus delbrueckii* subsp. *bulgaricus* deposited under the number CNCM I-1632 or *Lactobacillus delbrueckii* subsp. *bulgaricus* deposited under the number CNCM I-1519, or *Lactobacillus delbrueckii* subsp. *bulgaricus* deposited under the number CNCM I-2787,

*Lactobacillus acidophilus* deposited under the number CNCM I-2273,

*Lactobacillus rhamnosus* deposited under the number CNCM I-4993,

*Streptococcus thermophilus* deposited under the number CNCM-1630, or *Streptococcus thermophilus* deposited under the number CNCM-4992 or *Streptococcus thermophilus* deposited under the number CNCM-5030,

*Lactococcus lactis* subsp. *lactis* deposited under the number CNCM-1631,

*Lactococcus lactis* subsp. *cremoris* deposited under the number CNCM-3558,

*Bifidobacterium animalis* subsp. *lactis* deposited under the number CNCM-2494, and combinations thereof. The above-mentioned lactic acid bacteria have been deposited under the Budapest treaty at the Collection Nationale de Cultures de Micro-organismes (CNCM) located at Institut Pasteur's headquarters (25 rue du Docteur Roux 75724 PARIS Cedex 15 FRANCE).

In additional embodiments other bacteria may be added during fermentation, and such may comprise probiotic bacteria. Probiotic bacteria are known by those of skill in the art. Examples of probiotic bacteria include, for example, some Bifidobacteria and Lactobacilli, such as *Bifidobacterium brevis, Bifidobacterium animalis animalis, Bifidobacterium animalis lactis, Bifidobacterium infantis, Bifidobacterium longum, Lactobacillus helveticus, Lactobacillus casei, Lactobacillus casei paracasei, Lactobacillus acidophilus, Lactobacillus rhamnosus, Lactobacillus plantarum, Lactobacillus reuteri, Lactobacillus delbrueckiisubspbulgaricus, Lactobacillus delbrueckiisubsplactis, Lactobacillus brevis, Lactobacillus fermentum*, and mixtures thereof.

In one embodiment the lactic acid bacteria do not comprise Bifidobacteria. In one embodiment the lactic acid bacteria do not comprise *Lactobacillus acidophilus* bacteria. In one embodiment the lactic acid bacteria do not comprise Bifidobacteria and do not comprise *Lactobacillus acidophilus* bacteria.

The lactic acid bacteria may be introduced in any appropriate form, for example, in a spray-dried form, a freeze-dried form or in a frozen form, preferably in a liquid form. The introduction of the lactic acid bacteria in the dairy material is also referred to as an inoculation.

In an embodiment, the strained acidic, for example fermented, dairy product has lactic acid bacteria in a live or viable form.

Lactase

The lactase used in the present invention can be any kind of lactase such as Maxilact® marketed by DSM, in particular Maxilact® Lgi 5000 or Ha-Lactase™ 5200 commercialized by CHR Hansen. Lactase or beta-galactosidase (E.C: 3.2.1.23) is an enzyme, which catalyzes the hydrolysis of lactose (a disaccharide) into its component monosaccharides glucose and galactose. Lactases have been isolated from a large variety of micro-organisms. The lactase may be an intracellular or an extracellular produced lactase.

The lactase and the culture of bacteria are added to the dairy product simultaneously or separately. Advantageously, the lactase is added before or along with the culture of bacteria. Preferably, the lactase is added to the dairy product before the culture of bacteria, notably 10 to 40 min before the culture of bacteria, in particular 20 to 30 min before the culture of bacteria.

Heat Treatments

The process may comprise at least one heat treatment step, for example during step 1). It typically involves heat treating the liquid dairy material, before or after the dilution step, and before an acidification step, in particular if such a step involves fermenting with lactic acid bacteria. Such heat treatments are known by those of skill in the art as, for example, pasteurization or sterilization. Heat treatments are used to eliminate micro-organism contaminants such as, for example, bacteria. Heat treatments may be performed in conventional heat exchangers, such as tube or plate heat exchangers. The heat treatment may, for example, be performed at a temperature of from 80° C. to 99° C., and more particularly from 85° C. to 95° C. for, for example, from 1 minute to 15 minutes.

The process may further comprise a homogenization step before or after the heat treatment step, more particularly at a pressure of from 20 bars to 300 bars, and more particularly from 50 bars to 250 bars.

After heat treatment, the liquid dairy material is typically cooled down to a fermentation temperature.

Step 2)—Separation

The process typically involves a separation step. The separation step is performed on the liquid acidic carbohydrate-diluted dairy product and produces products comprising:

A) a strained acidic dairy product, having a reduced carbohydrate concentration

B) an acid whey by-product.

In this step, the acid whey by-product is separated from the fermented dairy product or curd resulting from protein coagulation. Following the separation step one generates:

the strained acidic dairy product typically which comprises coagulated proteins, referred to as a strained acidic, for example fermented, dairy product, and more particularly a strained acidic, for example fermented, dairy product having reduced carbohydrate concentrations; and the acid whey composition as a by-product.

Such separation steps are known by those of skill in the art, for example, in processes for making "Greek yogurts". The separation may, for example, be carried out by reverse osmosis, ultrafiltration, or centrifugation. The separation step may be performed, for example, at a temperature of from 30° C. to 45° C.

In an embodiment, the strained acidic dairy product has a reduced carbohydrate concentration and a Calcium/Protein ratio of higher than 0.03.

In a particular embodiment, the separation is carried out such that the protein concentration in the strained acidic, for example fermented, dairy product, is multiplied by a factor of at least 2.0, such as at least 3.0, with reference to the protein concentration of the liquid acidic, for example fermented, carbohydrate-diluted dairy product. The factor is preferably at most 7.0, for example from 2.0 to 3.0 or from 3.0 to 4.0 or from 4.0 to 5.0 or from 5.0 to 6.0 or from 6.0 to 7.0. The separation is particularly carried out such that the acid whey by-product is at least ⅔ by weight of the liquid acidic, for example fermented, carbohydrate-diluted dairy product and the strained acidic, for example fermented, dairy product is at most ⅓ by weight. More particularly, the acid whey by-product is at most 6/7 by weight and the strained product is at least 1/7. For example, the acid whey by-product is from ⅔ to ¾ and the strained product is from ¼ to ⅓, or the acid whey by-product is from ¾ to ⅘ and the strained product is from ⅕ to ¼, or the acid whey by-product is from ⅘ to ⅚ and the strained product is from ⅙ to ⅕, or the acid whey by-product is from ⅚ to 6/7 and the strained product is from 1/7 to ⅙.

In an embodiment, the strained acidic, for example fermented, dairy product has a protein concentration of at least 6.00% by weight. The protein concentration can be at most 18.00% by weight, for example from 6.00 to 7.00% or from 7.00 to 8.00%, or from 8.00 to 9.00%, or from 9.00 to 10.00%, or from 10.00 to 11.00% or from 11.00 to 12.00%, or from 12.00% to 15.00% or from 15.00 to 18.00%.

In an embodiment, the strained acidic, for example fermented, dairy product has a ratio between the amount by weight of protein and the amount of carbohydrate of at least 3.00. The ratio can be of up to 10.00. For example, the ratio may be from 3.00 to 4.00, or from 4.00 to 5.00; or from 5.00 to 6.00; or from 6.00 to 7.00, or from 7.00 to 8.00, or from 8.00 to 9.00, or from 9.00 to 10.00. In an embodiment, this ratio is increased by at least 20%, with reference to the ratio between the amount of protein and the amount of carbohydrate in the liquid acidic, for example fermented, carbohydrate-diluted dairy product. The increase can be of at least 30% or at least 40%, or at least 50% or at least 60% or at least 70%, or at least 80% or at least 90%, or at least 100%, or at least 150% or at least 200%. The increase is typically at most 500%.

The strained fermented dairy product comprises a high amount of proteins and has reduced carbohydrate concentration and is suitable and valuable for consumption. It is also referred to herein as "White Mass" having reduced carbohydrate concentration.

It is mentioned that the process can involve addition of ingredients or preparations further to the ingredients, preparations, components or compositions mentioned above, at various steps. For example, some ingredients mentioned in the section concerning intermediate preparation can be added before a further processing Step 3).

Temperatures

In a particular embodiment:
the heat treatment is performed at a temperature of 80° C. to 99° C., more particularly 85° C. to 95° C.,
the acidification, e.g. fermentation, is performed at a temperature of 30° C. to 45° C., and
the separation step is performed at a temperature of 30° C. to 45° C.

The process may comprise at least one cooling step. For example, the process may involve a cooling between the heat treatment and the acidification (e.g. fermentation). The process may involve a cooling step performed on the strained fermented dairy product having reduced carbohydrate concentrations, to reach a storage temperature, for example a chilled temperature of from 1° C. to 10° C., for example 4° C. In one embodiment, the process comprises a cooling step of the strained acidic, e.g. fermented, dairy product having reduced carbohydrate concentrations, to a temperature of from 4° C. to 10° C.

In a particular embodiment, the process described herein comprises a heat treatment step such as a temperature increase step, at the end of the fermentation and before the separation, referred to as thermoshocking step. This step is typically performed by raising the temperature to a temperature from 50° C. to 75° C., more particularly from 50° C. to 60° C. Such a thermoshocking step can contribute to stabilizing the organoleptic properties of the strained acidic, e.g. fermented, dairy product having reduced carbohydrate concentrations.

In an embodiment, the strained acidic, for example fermented, dairy product has strains, lactic acid bacteria in a live or viable form. The temperatures conditions applied are sufficiently favorable to the survival of lactic acid bacteria.

In a particular embodiment, the process involves the following phases:

Dilution before, during, or after Acidification such as Fermentation→Temperature increase (Thermoshocking) →Separation→Cooling of strained acidic (e.g. fermented) dairy product.

Step 3)—Further Processing

The strained acidic, for example fermented, dairy product is recovered and optionally processed for example to a further food form and/or mixed with further food ingredients It can be for example stored in a tank, introduced into food packaging, used as an ingredient involved in preparing a food in a further form (for example powders, bites, crisps, fillings) and/or mixed with further food ingredients. In a particular embodiment, a modifying preparation is associated with or mixed with the strained acidic, for example fermented, dairy product. Modifying preparations include for example intermediate preparation described below, particularly slurry or fruit preparations. Such intermediate preparations are useful to modify or other adjust some properties of the product such as stability or organoleptic properties, for example the texture, the taste and/or the flavor.

In one embodiment the strained acidic, for example fermented, dairy product is further processed with an intermediate preparation to provide a modified acidic, for example fermented, dairy product. The intermediate preparation can be mixed with or arranged as layers or discrete inclusions in the strained acidic, for example fermented, dairy product. Such a modified acidic, for example fermented, dairy product is also referred to as a finished product or adjusted product, or flavored product.

The ratio by weight between the strained acidic, for example fermented, dairy product and the intermediate preparation can be for example of from 50/50 to 99/1, preferably from 60/40 to 95/5, for example form 50/50 to 60/40 or from 60/40 to 70/30 or from 70/30 to 75/25 or from 75/25 to 80/20 or from 80/20 to 85/15, or from 85/15 to 90/10 or from 90/10 to 95/5 or from 95/5 to 99/1.

Smoothing

The process of the invention may comprise a step wherein the strained acidic, e.g. fermented, dairy product undergoes a smoothing step. Such steps typically involve some agitation and/or shear, and are known by those of skill in the art. The smoothing step may be performed, for example, by agitation, or by static or dynamic smoothing. In one embodiment, the smoothing is a dynamic smoothing, performed with a rotor stator mixer such as that described in, for example, WO2007/095969. With respect to processes described herein, "rotor stator mixer" refers to equipment in which the product goes through cogged rings, a part of the rings being static, the remaining part being in rotation at a set speed. This system of cogged rings partly static or in rotation applies a defined shearing to the product. In a particular embodiment, the rotor stator mixer comprises a ring shaped rotor and a ring shaped stator, each ring of the rotor and the stator being provided with radial slots having a given width, comprising adjusting the rotational speed of the rotor to adjust the peripheral velocity. The rotor may be operated so that the peripheral velocity is between 2 m/s and 13 m/s, in particular between 3 m/s and 5 m/s and more particularly between 3.6 m/s and 4 m/s. For example, the process can comprise a dynamic smoothing step, more particularly performed with a rotor stator mixer, at a temperature of from 30° C. to 45° C.

The smoothing step can be performed before or after adding an intermediate preparation. The smoothing step can provide or contribute to mixing the intermediate preparation.

Intermediate Preparations

Intermediate preparations are known by those skilled in the art. They are typically used to modify the taste, the mouthfeel and/or texture of a dairy composition, for example of an acidic, e.g. fermented, dairy composition or a strained acidic, e.g. fermented, dairy composition. They can also be used to introduce some additives such as nutrients. They typically comprise sweetening agents, flavors, color modifiers, stabilizers, regulators, fibers, cereals and/or fruit. Intermediate preparations are for example slurries or fruit preparations. Flavors include for example fruit flavors, baked foods flavors, confectionary flavors, vanilla flavors, caramel flavors, coffee flavors, and/or chocolate flavors. The intermediate preparations that comprise fruits are called fruit preparations. Herein fruits refer to any fruit form, including for example full fruits, pieces, purees, concentrates, juices, etc.

The intermediate preparation, in particular in the form of a slurry, typically comprises a stabilizing system, having at least one stabilizer. The stabilizing system can comprise at least two stabilizers. Such stabilizers are known by those skilled in the art. They typically help in avoiding phase separation of solids, for examples of fruits or fruits extracts and/or in avoiding syneresis. They typically provide some viscosity to the composition, for example a viscosity (Bostwick viscosity at 20° C.) of from 1 to 20 cm/min, preferably of from 4 to 12 cm/min.

The stabilizing system or the stabilizer can for example be a starch, a pectin, a guar, a xanthan, a carrageenan, a locust bean gum, or a mixture thereof. The amount of stabilizing system is typically of from 0.5 to 5% by weight.

The intermediate preparation can typically comprise organoleptic modifiers. Such ingredients are known by those skilled in the art.

The organoleptic modifiers can be for example sweetening agents, coloring agents, cereals and/or cereal extracts.

Examples of sweetening agents are sugars ingredients, and ingredients referred to as High Intensity Sweeteners, such as steviol glycosides, sucralose, acesulfamK, aspartam, saccharine, D-allulose, erythritol, and Luo Han Guo ingredients and their mixtures or associations.

Example of sugar ingredients are sugar, sucrose, fructose syrup, sugarcane syrup, high fructose corn syrup or the like.

In a particular embodiment the intermediate is substantially free of added sugar, for example substantially free of sugar, sucrose, fructose syrup, sugarcane syrup, high fructose corn syrup or the like.

Examples of Luo Han Guo ingredients include monk fruit, monk fruit extract and mogrosides, such as mogroside V.

Examples of steviol glycosides include stevioside, rebaudioside A, rebaudioside B, rebaudioside C, rebaudioside D, rebaudioside M, and their mixtures or associations. In a particular embodiment the intermediate preparation comprises rebaudioside M as a sweetener or as a sweetness enhancer. Rebaudioside M provide an interesting sweetness or sweetness enhancement, with limited negative taste defaults associated to stevioside or other rebaudiosides. In an embodiment the intermediate preparation, and the amount thereof is such that the modified strained acidic dairy product comprise an amount weight of rebaudioside M from 15 ppm to 600 ppm, for example from 15 ppm to 20 ppm, or from 20 ppm to 30 ppm, or from 30 ppm to 50 ppm, or from 50 ppm to 100 ppm, or from 100 ppm to 150 ppm, or from 150 ppm to 200 ppm, of from 200 ppm to 250 ppm, or from 250 ppm to 300 ppm, or from 300 ppm to 400 ppm, or from 400 ppm or 500 ppm, or from 500 ppm to 600 ppm. Rebaudioside M, as main or sole sweetener, in amounts of from 150 ppm to 200 ppm or 200 ppm to 250 ppm prove efficient in provide a good sweetness.

Examples of fruits include for example strawberry, peach, apricot, mango, apple, pear, raspberry, blueberry, blackberry, passion, cherry, and mixtures or associations thereof Example of fruit flavors include strawberry flavors, peach flavors, apricot flavors, mango flavors, apple flavors, pear flavors, raspberry flavors, blueberry flavors, blackberry flavors, passion flavors, cherry flavors, and mixtures or associations thereof.

The fruits can be for example provided as:
frozen fruit cubes, for example 10 mm fruit cubes, for example individual quick frozen fruit cubes, for example strawberry, peach, apricot, mango, apple, pear fruit cubes or mixtures thereof,
aseptic fruit cubes, for example 10 mm fruit cubes, for example strawberry, peach, apricot, mango, apple or pear fruit cubes or mixtures thereof,
fruit purees, for example fruit purees concentrated from 2 to 5 times, more particularly 3 times, for example aseptic fruit purees, for example strawberry, peach, apricot, mango, raspberry, blueberry or apple fruit purees or mixtures thereof,
aseptic fruit purees, for example strawberry, raspberry, peach, apricot, blueberry or apple single aseptic fruit purees or mixture thereof,
frozen whole fruits, for example individual quick frozen whole fruits, for example blueberry, raspberry or blackberry frozen whole fruits, or mixtures thereof,
mixtures thereof.

The ingredients and/or components of the intermediate preparation and the amounts thereof can be typically such that the intermediate preparation has a brix degree of from 1 to 65 brix, for example from 1 to 10 brix, or from 10 to 15 brix, or from 15 to 20 brix, or from 20 to 25 brix, or from 25 to 30 brix, or from 30 to 35 brix, or from 35 to 40 brix, or from 40 to 45 brix, or from 45 to 50 brix, or from 50 to 55 brix, or from 55 to 60 brix, or from 55 to 60 brix, or from 60 to 65 brix.

A fruit preparation can for example comprise fruit in an amount of from 30% to 80% by weight, for example from 50 to 70% by weight.

The intermediate preparation can comprise water. In a particular embodiment, a portion of the water can come from ingredients used to prepare the intermediate preparation, such as fruit preparation, for example from fruits or fruit extracts or from a phosphoric acid solution.

The intermediate preparation, such as a fruit preparation or slurry can comprise pH modification agents such as citric acid. The intermediate preparation, such as fruit preparation can have a pH of from 2.5 to 5, preferably of from 2.8 to 4.2.

In an embodiment, the intermediate preparation is such that its carbohydrate content, preferably its sugar content, is of at most 10 g per 100 g of intermediate preparation, preferably at most 6 g per 100 g, preferably at most 4.0 g per 100 g, for example from 4.0 g per 100 g to 3.5 g per 100 g, or from 3.5 g per 100 g to 3.0 g per 100 g, or from 3.0 g per 100 g to 2.5 g per 100 g, or from 2.5 g per 100 g to 2.0 g per 100 g or from 2.0 g per 100 g to 1.5 g per 100 g.

In an embodiment, the intermediate preparation and the amount thereof and/or the ingredients or components and amounts thereof are such that the carbohydrate content, preferably the sugar content, in the modified stained acidic, for example fermented, dairy product is low. For example, the amount can be at most 4 (4.0) g per 100 g of modified product, or at most 3 (3.0) g per 100 g, or at most 2 (2.0) g per 100 g or at most 1.5 g per 100 g.

In one embodiment the modified strained acidic, for example fermented, dairy product is substantially free of added sugar.

In an embodiment, the intermediate preparation and the amount thereof, and/or the ingredients or components and amounts thereof; are such that the modified strained acidic, for example fermented, dairy product has a ratio between the amount by weight of protein and the amount of carbohydrate, preferably of sugar, of at least 3.00. The ratio can be of up to 10.00. For example, the ratio may be from 3.00 to 4.00, or from 4.00 to 5.00; or from 5.00 to 6.00; or from 6.00 to 7.00, or from 7.00 to 8.00, or from 8.00 to 9.00, or from 9.00 to 10.00.

Exemplary Processes for Making Strained Fermented Dairy Products Having Reduced Carbohydrate Concentration First Exemplary Embodiment In a first embodiment, a strained fermented dairy product having reduced carbohydrate concentration is manufactured by diluting a liquid initial dairy material comprising milk having 3.3% total nitrogen (protein) and 4.0% milk sugar with water to generate a diluted liquid initial dairy material having <3.0% milk sugar. The liquid initial dairy material may comprise a mixture of skim milk and cream. In a particular embodiment, the liquid initial dairy material is diluted with an equal volume of water to generate a diluted liquid initial dairy material having about 1.7% total nitrogen and about 2.0% milk sugar. In a more particular embodiment, the liquid initial dairy material is diluted with at least one (1) volume of water to four (4) volumes of liquid dairy material to generate a diluted liquid dairy material having <2.0% milk sugar. The diluted liquid initial dairy material is fermented as described herein to generate a fermented diluted liquid dairy product The fermented diluted liquid dairy product is separated with a centrifuge separator (flow rate ratio of ~5 inlets=1 outlet), to obtain:
A) a strained fermented dairy product having reduced carbohydrate concentration relative to the liquid initial dairy material from which it is made, and
B) an acid whey by-product.

The first embodiment may further comprise heat treatment of the liquid initial dairy material prior to dilution or heat treatment of diluted liquid initial dairy material; homogenization of heat treated liquid initial dairy material prior to dilution or homogenization of heat treated diluted liquid initial dairy material; temperature increase of the fermented diluted liquid dairy product ("fermented mix thermoshock"); and dynamic smoothing, performed on the strained fermented dairy product having reduced carbohydrate concentration. The first embodiment typically involves a concentration ratio of 5-6× (i.e. the final protein content is 5-6× higher than the initial protein content) during the centrifugation step due to dilution of the liquid dairy product prior to the fermentation step.

A strained fermented dairy product having reduced carbohydrate concentration produced in accordance with the first embodiment typically has a total nitrogen content of about 9.5% and a milk sugar content of about 1.6%. Thus, the process of the first embodiment results in a 60% reduction in carbohydrate concentration relative to the liquid initial dairy material (starting material).

Second Exemplary Embodiment

In a second embodiment, a strained fermented dairy product having reduced carbohydrate concentration is manufactured by fermenting a liquid initial dairy material comprising milk having 3.3% total nitrogen (protein) and 3.0% milk sugar; diluting the fermented liquid dairy product with water (at, e.g., ~1:1 dilution of fermented liquid dairy product with water); and separating the diluted fermented liquid dairy product with a centrifuge separator (flow rate ratio of ~5 inlets=1 outlet), to obtain:
A) a strained fermented dairy product having reduced carbohydrate concentration relative to the liquid initial dairy material from which it is made, and
B) an acid whey by-product.

In a particular embodiment, the fermented liquid dairy product is diluted with at least one (1) volume of water to four (4) volumes of fermented liquid dairy product to generate the diluted fermented liquid dairy product.

The second embodiment may further comprise heat treatment of the liquid initial dairy material prior to fermentation; homogenization of heat treated liquid initial dairy material prior to fermentation; temperature increase of the fermented diluted liquid dairy product ("fermented mix thermoshock"); and dynamic smoothing, performed on the strained fermented dairy product having reduced carbohydrate concentration. The second embodiment typically involves a concentration ratio of 5-6× during the centrifugation step due to dilution of the liquid dairy product after the fermentation step.

A strained fermented dairy product having reduced carbohydrate concentration produced in accordance with the second embodiment typically has a total nitrogen content of about 9.5% and a milk sugar content of <1.5%. Thus, the process of the second embodiment results in a >50% reduction in carbohydrate concentration relative to the liquid initial dairy material (starting material).

Third Exemplary Embodiment

In a third embodiment, a strained fermented dairy product having reduced carbohydrate concentration is manufactured by fermenting a diluted liquid initial dairy material comprising milk, water, and ultrafiltered (UF) milk having 3.3% total nitrogen (protein) and ≤1.0% milk sugar; and separating the fermented diluted liquid dairy material with a centrifuge separator (flow rate ratio of ~3 inlets=1 outlet), to obtain:
A) a strained fermented dairy product having reduced carbohydrate concentration relative to the liquid initial dairy material from which it is made, and
B) an acid whey by-product.

The third embodiment may further comprise heat treatment of the diluted liquid initial dairy material prior to fermentation; homogenization of heat-treated diluted liquid initial dairy material prior to fermentation; temperature increase of the fermented diluted liquid dairy product ("fermented mix thermoshock"); and dynamic smoothing, performed on the strained fermented dairy product having reduced carbohydrate concentration.

A strained fermented dairy product having reduced carbohydrate concentration produced in accordance with the third embodiment typically has a total nitrogen content of 8.0% to 11.0%, notably of about 9.5% and a milk sugar content of about 1.0%.

Fourth Exemplary Embodiment

In a fourth embodiment, a strained fermented dairy product having reduced carbohydrate concentration is manufactured by fermenting a diluted liquid initial dairy material comprising ultrafiltered (UF) and diafiltrated milk having 3.3% total nitrogen (protein) and ≤2.5% milk sugar, such as from 1.8 to 2.5% milk sugar, notably from 1.8% to 2.0% milk sugar; and separating the fermented diluted liquid dairy material with a centrifuge separator (flow rate ratio of ~3 inlets=1 outlet), to obtain:
A) a strained fermented dairy product having reduced carbohydrate concentration relative to the liquid initial dairy material from which it is made, and
B) an acid whey by-product.

The dilution step (step b)) is thus diafiltration which is performed simultaneously with the ultrafiltration step (step a)) of providing an initial dairy material (ultrafiltrated milk). The fourth embodiment may further comprise heat treatment of the diluted liquid initial dairy material prior to fermentation; homogenization of heat-treated diluted liquid initial dairy material prior to fermentation; temperature increase of the fermented diluted liquid dairy product ("fermented mix thermoshock"); and dynamic smoothing, performed on the strained fermented dairy product having reduced carbohydrate concentration.

A strained fermented dairy product having reduced carbohydrate concentration produced in accordance with the fourth embodiment typically has a total nitrogen content of 8.0% to 11.0%, notably of about 9.5% and a milk sugar content of from 1.0% to 1.6%, in particular from 1.0% to 1.3%.

Fifth Exemplary Embodiment

In a fifth embodiment, a strained fermented dairy product having reduced carbohydrate concentration is manufactured by fermenting a liquid initial dairy material comprising milk, water, and milk protein concentrate (MPC; which is low in carbohydrates) having 2.5%±1.0% total nitrogen (protein) and ≤2.5%, such as ≤2.0% milk sugar, preferably from 1.8% to 2.5% milk sugar such as from 1.8% to 2.0% milk sugar; and separating the fermented diluted liquid dairy material with a centrifuge separator (flow rate ratio of ~3-5 inlets=1 outlet), to obtain:
- A) a strained fermented dairy product having reduced carbohydrate concentration relative to the liquid dairy material from which it is made, and
- B) an acid whey by-product.

In a particular embodiment thereof, the milk sugar content of the diluted liquid initial dairy material comprising milk, water, and milk protein concentrate is <3.0%. In a more particular embodiment, the diluted liquid initial dairy material comprises skim milk diluted to achieve a sugar content of ≤2.0% carbohydrates, MPC added to increase the nitrogen content to about 2.5% without altering the carbohydrates content, and cream to increase the milk fat content to about 0.3%. The initial dilution may be performed on skim milk, reconstituted skim milk (skim milk powder and water), or reconstituted dairy mix having low carbohydrates. Other embodiments include the addition of at least one vegetal mix based on, for example, soy, rice, coconut, or avena, and combinations thereof to the liquid initial dairy material such that initial sugars are reduced.

The fifth embodiment may further comprise heat treatment of the diluted liquid initial dairy material prior to fermentation; homogenization of heat-treated diluted liquid initial dairy material prior to fermentation; temperature increase of the fermented diluted liquid dairy product ("fermented mix thermoshock"); and dynamic smoothing, performed on the strained fermented dairy product having reduced carbohydrate concentration.

A strained fermented dairy product having reduced carbohydrate concentration produced in accordance with the fifth embodiment typically has a total nitrogen content of about 9.5% and a milk sugar content of ≤1.0% or of from 1.0% to 1.6%, in particular from 1.0% to 1.3%. Thus, the process of the fifth embodiment results in ≤50% reduction in carbohydrate concentration relative to the liquid initial dairy material (starting material).

Fermentation cultures as described herein and implemented in any one of the exemplary embodiments presented herein may comprise:
- A) Thermophilic Lactic Acid Bacteria (to ferment at 40° C.), examples include without limitation *Streptococcus thermophilus* & *Lactobacillus bulgaricus*, and/or
- B) Mesophilic Lactic Acid Bacteria (to ferment at 30° C.) examples include without limitation *Lactococcus lactis* & *Lactococcus cremoris*.

Sixth Exemplary Embodiment

Methods for Using Strained Fermented Dairy Product Having Reduced Carbohydrate Concentration.

The strained fermented dairy products having reduced carbohydrate concentration, also referred to as "White Mass" (WM) having reduced carbohydrate concentration, are processed as finished products. For plain products, 150 grams (g) of White Mass having reduced carbohydrate concentration are conditioned in cups. For flavored products, 82% WM is mixed with 18% fruit preparation in the form of a slurry and conditioned in cups. In one embodiment, the fruit slurry comprises flavor agents, color agents, and stabilizers.

Seventh Exemplary Embodiment

Manufacture of Strained Fermented Dairy Products Having Reduced Carbohydrate Concentration In accordance with this embodiment, the liquid initial dairy material may be diluted at any point in the process prior to the fermentation step.

Strained fermented dairy products having reduced carbohydrate concentration are manufactured at pilot scale using the following ingredients:
- Liquid initial dairy material: Milk having 3.30% total nitrogen (protein) and 4.00% milk sugar. The ratio between protein and carbohydrate is about 0.8.
- Dilute 1 volume of milk with 1 volume of water to generate a diluted liquid initial dairy material having about 1.65% total nitrogen and 2.00% milk sugar. The ratio between protein and carbohydrate is about 0.8,
- heat treatment of diluted liquid initial dairy material at a temperature of 95° C.±3° C. for 5-7 minutes (e.g., 6.5 minutes),
- optionally: homogenization of heat treated diluted liquid initial dairy material at a temperature of 60° C., at a pressure of 69 bars (±20 bars), followed by dilution of heat treated liquid initial dairy material,
- inoculation of the diluted liquid initial dairy material with fermentation culture at appropriate temperature (e.g., 40° C.) with 0.002-0.02% (e.g., 0.02%) by weight of culture,
- optionally addition of 0.06% by weight of lactase,
- fermentation at a temperature of 40° C. to reach a breaking pH of 4.65±0.05,
- optionally: temperature increase ("fermented mix thermoshock") to a temperature of 59.5° C. for 2.5 minutes,
- separation, at a temperature of 41.5° C., with a centrifuge separator (e.g., a Westphalia KNA3 pilot scale centrifuge separator) flow rate ratio of 1 part by weight of strained fermented dairy product for 5 parts by weight of acid whey by-product (concentration of about 6×). The strained fermented dairy product has about 9.5% by weight of protein and 1.6% by weight of milk sugar. The ratio between protein and carbohydrate is about 5.9, and
- optionally, dynamic smoothing, performed on the strained fermented dairy product having reduced carbohydrate concentration.

The acid whey by-product has between 0.15 and 0.5% by weight of protein, in particular 0.4% by weight of protein and 2.0% by weight of milk sugar.

A strained fermented dairy product having reduced carbohydrate concentration produced in accordance with this embodiment, has a total nitrogen content of about 9.5% and a milk sugar content of about 1.6%. Accordingly, the process described in this embodiment produces a strained fermented dairy product having superior properties to those previously produced in that it has high protein levels as reflected by total nitrogen content and reduced carbohydrate content relative to strained fermented dairy products made using standard processes.

Eighth Exemplary Embodiment

Manufacture of Strained Fermented Dairy Products Having Reduced Carbohydrate Concentration Strained fermented dairy products having reduced carbohydrate concentration are manufactured at pilot scale using the following ingredients:
  Liquid initial dairy material: Milk having 3.3% total nitrogen (protein) and ≥3.0% milk sugar
  Fermentation cultures: as described herein above
  The procedure involves the following steps:
    heat treatment of liquid initial dairy material at a temperature of 95° C.±3° C. for 5-7 minutes (e.g., 6.5 minutes),
    optionally: homogenization of heat treated liquid initial dairy material at a temperature of 60° C. at a pressure of 69 bars (±20 bars),
    inoculation of heat treated liquid initial dairy material with fermentation culture at appropriate temperature (e.g., 40° C.) with 0.002-0.02 by weight of culture (e.g., 0.02% by weight of culture),
    fermentation at a temperature of 40° C. to reach a breaking pH of 4.65 (±0.05),
    optionally: temperature increase ("fermented mix thermoshock") to a temperature of 59.5° C. for 2.5 minutes,
    dilution of ~50% prior to separation (~1:1 dilution of fermented liquid dairy product with water),
    separation, at a temperature of 41.5° C., with a centrifuge separator (e.g., a Westphalia KNA3 pilot scale centrifuge separator; flow rate ratio of ~5 inlets=1 outlet), to obtain:
      A) a strained fermented dairy product having reduced carbohydrate concentration, and
      B) an acid whey by-product, and
    optionally, dynamic smoothing, performed on the strained fermented dairy product having reduced carbohydrate concentration.

In embodiments wherein the liquid dairy product is diluted after the fermentation step, a high degree of concentration is required. More particularly, a concentration ratio of 5-6× is required, which is higher than that required for other strained yogurts, which typically require a standard concentration ratio of 3-4×.

A strained fermented dairy product having reduced carbohydrate concentration produced in accordance with this embodiment, has a total nitrogen content of about 9.5% and a milk sugar content of ≤1.5%. Accordingly, the process described in this embodiment produces a strained fermented dairy product having superior properties to those previously produced in that it has high protein levels as reflected by total nitrogen content and reduced carbohydrate content relative to strained fermented dairy products made using standard processes.

In this embodiment, the fermentation is performed on a non-diluted liquid initial dairy material. Accordingly, the catabolism of milk sugar is more significant prior to separation because the breaking pH can be higher and this results in conversion of more carbohydrates into lactic acid.

Ninth Exemplary Embodiment

Manufacture of Strained Fermented Dairy Products Having Reduced Carbohydrate Concentration Strained fermented dairy products having reduced carbohydrate concentration are manufactured at pilot scale using the following ingredients:
  Liquid dairy material: comprising milk, water, and ultrafiltered (UF) milk having 3.3% total nitrogen (protein), ≤1.0% milk sugar. In this embodiment, the diluted liquid initial dairy material is diluted at the outset of the process.
  Fermentation cultures: as described herein above
  The procedure involves the following steps:
    heat treatment of diluted liquid initial dairy material at a temperature of 95° C.±3° C. for 5-7 minutes (e.g., 6.5 minutes),
    optionally: homogenization of heat treated diluted liquid initial dairy material at a temperature of 60° C. at a pressure of 69 bars (±20 bars),
    inoculation of diluted liquid initial dairy material with fermentation culture at appropriate temperature (e.g., 40° C.) with 0.002-0.02 by weight of culture (e.g., 0.02%) by weight of culture,
    fermentation at a temperature of 40° C. to reach a breaking pH of 4.65 (±0.05),
    optionally: temperature increase ("fermented mix thermoshock") to a temperature of 59.5° C. for 2.5 minutes,
    separation, at a temperature of 41.5° C., with a centrifuge separator (e.g., a Westphalia KNA3 pilot scale centrifuge separator; flow rate ratio of ~3 inlets=1 outlet), to obtain:
      A) a strained fermented dairy product having reduced carbohydrate concentration, and
      B) an acid whey by-product, and
    optionally; dynamic smoothing, performed on the strained fermented dairy product having reduced carbohydrate concentration.

In embodiments wherein the liquid initial dairy material is diluted prior to the fermentation step, the precise control of concentrations of protein and carbohydrates prior to fermentation makes it possible to use a standard concentration ratio of 3-4×, consistent with that used to generate other strained yogurts made using standard processes.

A strained fermented dairy product having reduced carbohydrate concentration produced in accordance with this embodiment, has a total nitrogen content of 8.0% to 11.0%, notably of about 9.5% and a milk sugar content of about ≤1.0%. Accordingly, the process described in this embodiment produces a strained fermented dairy product having superior properties to those previously produced in that it has high protein levels as reflected by total nitrogen content and reduced carbohydrate content relative to strained fermented dairy products made using standard processes.

Tenth Exemplary Embodiment

Manufacture of Strained Fermented Dairy Products Having Reduced Carbohydrate Concentration Strained fermented dairy products having reduced carbohydrate concentration are manufactured at pilot scale using the following ingredients:
  Liquid dairy material: comprising ultrafiltered (UF) and diafiltrated milk having 3.3% total nitrogen (protein) and ≤2.5% milk sugar, such as from 1.8 to 2.5% milk sugar, notably from 1.8% to 2.0% milk sugar. In this embodiment, the diluted liquid initial dairy material is diluted at the outset of the process.

Fermentation cultures: as described herein above

The procedure involves the following steps:

heat treatment of diluted liquid initial dairy material at a temperature of 95° C.±3° C. for 5-7 minutes (e.g., 6.5 minutes), optionally: homogenization of heat treated diluted liquid initial dairy material at a temperature of 60° C. at a pressure of 69 bars (±20 bars), inoculation of diluted liquid initial dairy material with fermentation culture at appropriate temperature (e.g., 40° C.) with 0.002-0.02 by weight of culture (e.g., 0.02%) by weight of culture, fermentation at a temperature of 40° C. to reach a breaking pH of 4.65 (±0.05), optionally: temperature increase ("fermented mix thermoshock") to a temperature of 59.5° C. for 2.5 minutes, separation, at a temperature of 41.5° C., with a centrifuge separator (e.g., a Westphalia KNA3 pilot scale centrifuge separator; flow rate ratio of ~3 inlets=1 outlet), to obtain:

A) a strained fermented dairy product having reduced carbohydrate concentration, and B) an acid whey by-product, and optionally; dynamic smoothing, performed on the strained fermented dairy product having reduced carbohydrate concentration.

In embodiments wherein the liquid initial dairy material is diluted prior to the fermentation step, the precise control of concentrations of protein and carbohydrates prior to fermentation makes it possible to use a standard concentration ratio of 3-4×, consistent with that used to generate other strained yogurts made using standard processes.

A strained fermented dairy product having reduced carbohydrate concentration produced in accordance with this embodiment, has a total nitrogen content of 8.0% to 11.0%, notably of about 9.5% and a milk sugar content of from 1.0% to 1.3%. Accordingly, the process described in this embodiment produces a strained fermented dairy product having superior properties to those previously produced in that it has high protein levels as reflected by total nitrogen content and reduced carbohydrate content relative to strained fermented dairy products made using standard processes.

Eleventh Exemplary Embodiment

Manufacture of Strained Fermented Dairy Products Having Reduced Carbohydrate Concentration Strained fermented dairy products having reduced carbohydrate concentration are manufactured at pilot scale using the following ingredients:

Liquid initial dairy material: comprising milk, water, and milk protein concentrate (MPC; which is low in carbohydrates) having 2.5%±1.0% total nitrogen (protein) and <3.0% milk sugar. In a particular embodiment thereof, the milk sugar content is ≤2.5%, such as ≤2.0%. For example, the milk sugar content is from 1.8% to 2.5%, such as from 1.8% to 2.0%. In this embodiment, the liquid initial dairy material is diluted at the outset of the process.

In a particular embodiment, the diluted liquid initial dairy material comprises skim milk diluted to achieve a sugar content of ≤2.5%, such as ≤2.0% carbohydrates, for example from 1.8% to 2.5%, such as from 1.8% to 2.0% carbohydrates, MPC is added to increase the nitrogen content to about 2.5% without altering the carbohydrates content.

The initial dilution may be performed on skim milk, reconstituted skim milk (skim milk powder and water), or reconstituted dairy mix having low carbohydrates.

Other embodiments include the addition of at least one vegetal mix based on, for example, soy, rice, coconut, or avena, and combinations thereof, to the liquid initial dairy material such that initial sugars are reduced.

Fermentation cultures: as described herein above

The procedure involves the following steps:

heat treatment of diluted liquid initial dairy material at a temperature of 95° C.±3° C. for 5-7 minutes (e.g., 6.5 minutes), optionally: homogenization of heat-treated diluted liquid initial dairy material at a temperature of 60° C. at a pressure of 69 bars (±20 bars), inoculation of diluted liquid initial dairy material with fermentation culture at appropriate temperature (e.g., 40° C.) with 0.002-0.02 by weight of culture (e.g., 0.02%) by weight of culture, fermentation at a temperature of 40° C. to reach a breaking pH of 4.65 (±0.05), optionally: temperature increase ("fermented mix thermoshock") to a temperature of 59.5° C. for 2.5 minutes, separation, at a temperature of 41.5° C., with a centrifuge separator (e.g., a Westphalia KNA3 pilot scale centrifuge separator; flow rate ratio of ~3-5 inlets=1 outlet), to obtain:

A) a strained fermented dairy product having reduced carbohydrate concentration, and B) an acid whey by-product, and optionally: dynamic smoothing, performed on the strained fermented dairy product having reduced carbohydrate concentrations.

A strained fermented dairy product having reduced carbohydrate concentration produced in accordance with this embodiment, has a total nitrogen content of about 9.5% and a milk sugar content of ≤1.0% or of from 1.0% to 1.6%, in particular from 1.0% to 1.3%. Accordingly, the process described in this embodiment produces a strained fermented dairy product having superior properties to those previously produced in that it has high protein levels as reflected by total nitrogen content and reduced carbohydrate content relative to strained fermented dairy products made using standard processes.

Twelfth Exemplary Embodiment

Manufacture of Strained Fermented Dairy Products Having Reduced Carbohydrate Concentration Strained fermented dairy products having reduced carbohydrate concentration are manufactured at pilot scale using the following ingredients:

Liquid initial dairy material: Milk having 3.45% total nitrogen (protein) and 5% milk carbohydrate comprising lactose. The ratio between protein and carbohydrate is about 0.69

Dilution liquid: Water

Culture: Yo-Mix® 495, marketed by Dupont

The manufacturing procedure is the following:

Provide the milk

Ultrafiltered the milk to produce a retentate having 9.74% total nitrogen (protein) and 5% milk carbohydrate comprising lactose and a permeate having 0.18% non protein nitrogen and 5% milk carbohydrate comprising lactose Dilute 1 volume of the retentate with around 3 volumes of water to generate a diluted liquid dairy material having about 3.2% total nitrogen and 1.6% milk carbohydrate comprising lactose.

homogenization of the diluted liquid dairy material at a temperature of 60° C., at a pressure of 69 bars (±20 bars), heat treatment of diluted liquid dairy material at a temperature of 95° C.±3° C. for 5-7 minutes (e.g. 6.5 minutes), inoculation of the diluted liquid dairy material at 40° C. with 0.004% by weight of the culture, fermentation at a temperature of 40° C. to reach a breaking pH of 4.50, separation, at a temperature of 41.5° C., with a centrifuge separator (e.g., a Westphalia KNA3 pilot scale centrifuge separator) at a flow rate ratio of around 1 part by weight of strained fermented dairy product for around 3 parts by weight of acid whey by-product (concentration of about ×2.8)—recovery of the strained fermented dairy product.

Results:

The strained fermented dairy product has 8.95% by weight of protein and around 1% by weight of milk carbohydrate comprising lactose.

The ratio between protein and carbohydrate is about 8.95.

The acid whey by-product has from 0.15 and 0.40% by weight of protein and around 1% by weight of milk carbohydrate comprising lactose.

Thirteenth Exemplary Embodiment

Manufacture of a Strained Fermented Dairy Product Having a Reduced Carbohydrate Concentration The following ingredients are used:

Liquid initial dairy material: Milk having 3.36% total nitrogen and 4.8% milk carbohydrate comprising lactose. The ratio between protein and carbohydrate is about 0.7

Dilution liquid: Water

Culture: DN-YOMIX GSD1 1500 DCU. Supplier: Danisco

The manufacturing procedure is the following:

Part I: Ultrafiltration

Provide the milk

Ultrafiltration of the milk to produce a retentate having 9.4% total nitrogen (protein) and 4.7% milk carbohydrate comprising lactose and a permeate having 0.17% total nitrogen (Non Proteic Nitrogen only).

Part II: Dilution & Separation

Dilute 1 volume of the milk with 3 volumes of water to generate a diluted liquid dairy material having about 3.2% total nitrogen and 1.6% milk carbohydrate comprising lactose.

Homogenization of the diluted liquid dairy material at a temperature of 73° C., at a pressure of 1000 psi (±100 psi), Heat treatment of diluted liquid dairy material at a temperature of 92° C.±2° C. for 5-7 minutes (e.g. 6.5 minutes), Inoculation of the diluted liquid dairy material at 40° C. with 0.0041% by weight of the culture, Fermentation at a temperature of 40° C. to reach a breaking pH of 4.75.

Separation, at a temperature of 40° C., with a centrifuge separator (KDB Separator) at a flow rate ratio of 1 part by weight of strained fermented dairy product for 3 parts by weight of acid whey by-product (concentration of about ×3).

Recovery of the strained fermented dairy product.

Results:

The strained fermented dairy product (white mass) has 9.6% by weight of protein and 0.65% by weight of milk carbohydrate comprising lactose.

The ratio between protein and carbohydrate is about 14.8.

The acid whey by-product has 0.16% by weight of protein

Further details or advantages of the invention are presented in the following non-limiting examples.

EXAMPLES

Example 1—Manufacture of a Strained Fermented Dairy Product Having a Reduced Carbohydrate Concentration The following ingredients are used:

Liquid initial dairy material: Milk having 3.30% total nitrogen (protein) and 4.00% milk carbohydrate comprising lactose. The ratio between protein and carbohydrate is about 0.82.

Dilution liquid: Water

Culture: Yo-Mix® 495, marketed by Dupont

The manufacturing procedure is the following

Provide the milk

Dilute 1 volume of the milk with 1 volume of water to generate a diluted liquid dairy material having about 1.65% total nitrogen and 2.00% milk carbohydrate comprising lactose. The ratio between protein and carbohydrate is about 0.82 homogenization of the diluted liquid dairy material at a temperature of 60° C., at a pressure of 69 bars (±20 bars), heat treatment of diluted liquid dairy material at a temperature of 95° C.±3° C. for 5-7 minutes (e.g., 6.5 minutes), inoculation of the diluted liquid dairy material at 40° C. with 0.004% by weight of the culture, fermentation at a temperature of 40° C. to reach a breaking pH of 4.50, separation, at a temperature of 41.5° C., with a centrifuge separator (e.g., a Westphalia KNA3 pilot scale centrifuge separator) at a flow rate ratio of 1 part by weight of strained fermented dairy product for 4.2 parts by weight of acid whey by-product (concentration of about ×5.2)—recovery of the strained fermented dairy product.

Results:

The strained fermented dairy product has 9.5% by weight of protein and 1.6% by weight of milk carbohydrate comprising lactose.

The ratio between protein and carbohydrate is about 5.9.

The acid whey by-product has 0.4% by weight of protein and 2.0% by weight of milk carbohydrate comprising lactose.

Comparative Example 1—Standard Manufacture of a Strained Fermented Dairy Product The procedure according to example 1 is carried out, without the dilution step and as a consequence with a lower concentration factor: the separation is carried out at a flow rate ratio of 1 part by weight of strained fermented dairy product to 3 parts by weight of acid whey by-product (concentration of about ×3).

Results:

The strained fermented dairy product has 10.0% by weight of protein and 4.0% by weight of milk carbohydrate comprising lactose.

The ratio between protein and carbohydrate is about 2.5.

It can be seen that the process according to the invention reduces the amount of carbohydrate and increases the protein to carbohydrate yield during concentration.

The invention claimed is:

1. A process for making a strained acidic dairy product comprising the steps of:
   step 1) preparing a liquid acidic carbohydrate-diluted dairy product comprising proteins and having a carbohydrate concentration of at most 3.00% by weight of the total weight of the liquid acidic carbohydrate-diluted dairy product, a protein concentration from 1.50% to 2.75% by weight of the total weight of the liquid acidic carbohydrate-diluted dairy product, and a pH of at most 5.00, the step 1) comprising:
      step a) providing an initial dairy material comprising proteins and at least one carbohydrate, wherein the at least one carbohydrate comprises at least one of lactose, galactose, glucose, galacto-oligosaccharides, or mixtures thereof,
      step b) diluting the at least one carbohydrate by adding an aqueous dilution liquid, and
      step c) acidifying by: fermenting with lactic acid bacteria, fermenting with enzymes or adding an acidic compound,
   step 2) separating the liquid acidic carbohydrate-diluted dairy product to produce products comprising:
      A) a strained acidic dairy product, having a reduced carbohydrate concentration relative to the liquid initial dairy material from which it is made, and
      B) an acid whey by-product,
   step 3) recovering the strained acidic dairy product, and optionally processing it to a further food from and/or mixing it with further food ingredients.

2. The process according to claim 1, wherein the step 1) comprises the step a), then the step b), then the step c).

3. The process according to claim 1, wherein the step 1) comprises the step a), then the step b) and the step c), wherein the step b) and the step c) are concomitant.

4. The process according to claim 1, wherein the step 1) comprises the step a), then the step c), then the step b).

5. The process according to claim 1, wherein the initial dairy material is a liquid initial dairy material having an initial carbohydrate concentration of more than 3.70%, and wherein diluting reduces the carbohydrate concentration by at least 20% relative to that of the initial carbohydrate concentration.

6. The process according to claim 1, wherein the liquid acidic carbohydrate-diluted dairy product has a carbohydrate concentration of at most 2.50% by weight.

7. The process according to claim 1, wherein the liquid acidic carbohydrate-diluted dairy product has a carbohydrate concentration of at least 0.50% by weight.

8. The process according to claim 1, wherein the liquid acidic carbohydrate-diluted dairy product has a protein concentration of from 1.50% to 2.50% by weight.

9. The process according to claim 1, wherein the liquid acidic carbohydrate-diluted dairy product has a ratio by weight of protein to carbohydrate of from 0.50 to 1.50.

10. The process according to claim 1, wherein the initial dairy material is in a liquid form, and the step b) is performed between the step a) and the step c) and comprises mixing 1 part by volume of the initial dairy material with at least 0.25 part by volume of the aqueous dilution liquid.

11. The process according to claim 1, wherein the initial dairy material is in a liquid form, the step c) is performed after the step a) to produce an initial acidified dairy material, and the step b) is performed after the step a) and the step c) and comprises mixing 1 part by volume of the initial acidified dairy material with at least 0.25 part by volume of the aqueous dilution liquid.

12. The process according to claim 10, where the mixing is performed with at most 4 parts by volume of the aqueous dilution liquid.

13. The process according to claim 1, wherein the liquid acidic carbohydrate-diluted dairy product has a pH of at most 4.80.

14. The process according to claim 1, wherein the step b) of diluting is performed batch-wise.

15. The process according to claim 1, wherein the step b) of diluting is performed continuously throughout the process.

16. The process according to claim 1, wherein the step b) of diluting further comprises mixing.

17. The process according to claim 1, wherein the separating step 2) is centrifugation or ultrafiltration.

18. The process according to claim 1, wherein the initial dairy material comprises at least one of milk, half skimmed milk, skimmed milk, milk powder, skimmed milk powder, milk concentrate, condensed milk, skim milk concentrate, condensed skim milk, evaporated milk, evaporated skim milk, ultrafiltered milk retentate, ultrafiltered skim milk retentate, microfiltered milk, microfiltered skim milk, milk proteins, milk protein concentrate (MPC), whey protein, whey protein concentrate (WPC), whey protein isolate (WPI), casein or caseinate, cream, buttermilk, or mixtures thereof.

19. The process according to claim 1, wherein the strained acidic dairy product having a reduced carbohydrate concentration has a calcium/protein ratio of higher than 0.03.

20. The process according to claim 1, wherein the strained acidic dairy product has a protein content of at least 6.00% by weight.

21. The process according to claim 1, wherein the strained acidic dairy product has an amount by weight of protein, an amount of carbohydrate, and a ratio between the amount by weight of protein and the amount of carbohydrate, wherein the ratio between the amount by weight of protein and the amount of carbohydrate is of at least 3.00.

22. The process according to claim 21, wherein the ratio between the amount by weight of protein and the amount of carbohydrate in the strained acidic dairy product is of at least 5.00.

23. The process according to claim 1, wherein the aqueous dilution liquid is substantially free of carbohydrate, and optionally substantially free of protein.

24. The process according to claim 23, wherein the aqueous dilution liquid is water.

25. The process according to claim 1, wherein the process is free of a lactose addition step.

26. The process according to claim 1, further comprising:
   diluting the strained acidic dairy product having a reduced carbohydrate concentration with water, wherein the diluting of the strained fermented dairy product having a reduced carbohydrate concentration relative to the liquid initial dairy material from which it is made with water comprises diluting 4 volumes of the strained fermented dairy product having a reduced carbohydrate concentration with at least 1 volume of water to produce a diluted strained fermented dairy product having a reduced carbohydrate concentration, and separating the diluted strained acidic dairy product having a reduced carbohydrate concentration to produce i) a secondary strained acidic dairy product having a reduced carbohydrate concentration relative to that of the carbohydrate concentration of the strained fermented dairy product having a reduced carbohydrate concentration, and ii) an acid whey by-product.

27. The process according to claim 26, wherein the diluting of the strained acidic dairy product having a reduced carbohydrate concentration with water further comprises mixing.

* * * * *